(12) United States Patent
Saive et al.

(10) Patent No.: US 11,041,338 B2
(45) Date of Patent: Jun. 22, 2021

(54) WINDOWS IMPLEMENTING EFFECTIVELY TRANSPARENT CONDUCTORS AND RELATED METHODS OF MANUFACTURING

(71) Applicant: California Institute of Technology, Pasadena, CA (US)

(72) Inventors: Rebecca Saive, Enschede (NL); Harry A. Atwater, South Pasadena, CA (US); Thomas C. R. Russell, Pasadena, CA (US); Michael D. Kelzenberg, Glendale, CA (US); Lucas J. Myers, Stoughton, WI (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 16/547,511

(22) Filed: Aug. 21, 2019

(65) Prior Publication Data

US 2020/0063487 A1     Feb. 27, 2020

Related U.S. Application Data

(60) Provisional application No. 62/741,631, filed on Oct. 5, 2018, provisional application No. 62/720,748, filed on Aug. 21, 2018.

(51) Int. Cl.
*B32B 15/04* (2006.01)
*B32B 17/06* (2006.01)
(Continued)

(52) U.S. Cl.
CPC .......... *E06B 3/6715* (2013.01); *E06B 3/6612* (2013.01); *E06B 9/24* (2013.01);
(Continued)

(58) Field of Classification Search
CPC .......... E06B 3/6715; E06B 2009/2417; E06B 3/6612
(Continued)

(56) References Cited

U.S. PATENT DOCUMENTS 3,278,811 A    10/1966  Hiroshi
4,621,898 A *  11/1986  Cohen .................. G02B 5/22
                                                        359/601
(Continued)

FOREIGN PATENT DOCUMENTS

CN     101598717 A     12/2009
DE   112018004186 T5    5/2020
(Continued)

OTHER PUBLICATIONS

Sahin et al., "Monte-Carlo simulation of light propagation in luminescent solar concentrators based on semiconductor nanoparticles", Journal of Applied Physics, vol. 110, No. 3, Aug. 11, 2011, pp. 03108-1-033108-8.
(Continued)

*Primary Examiner* — Lauren R Colgan
(74) *Attorney, Agent, or Firm* — KPPB LLP

(57) ABSTRACT

Systems and methods for transparent materials implementing effectively transparent conductors in accordance with various embodiments of the invention are illustrated. One embodiment includes a window including a first transparent layer of transparent material having a first surface and a second surface, a first plurality of triangular conductors in optical communication with the first transparent layer of glass, wherein each of the first plurality of triangular conductors includes a base side that is parallel to the first surface of the first transparent layer of glass and wherein the first plurality of triangular conductors is configured to redirect a portion of incident light, wherein the portion of incident
(Continued)

light travels through both the first surface and the second surface of the first transparent layer of glass.

12 Claims, 20 Drawing Sheets

(51) Int. Cl.
  *E06B 3/67* (2006.01)
  *E06B 9/24* (2006.01)
  *E06B 3/66* (2006.01)
  *G02B 5/00* (2006.01)
(52) U.S. Cl.
  CPC ............. *E06B 2009/2417* (2013.01); *E06B 2009/2464* (2013.01); *G02B 5/003* (2013.01)
(58) Field of Classification Search
  USPC .............. 428/426, 432, 119; 136/246, 256
  See application file for complete search history.

(56) References Cited

U.S. PATENT DOCUMENTS

| | | | |
|---|---|---|---|
| 4,771,017 A | | 9/1988 | Tobin et al. |
| 5,075,262 A | | 12/1991 | Nguyen et al. |
| 5,076,857 A | * | 12/1991 | Nowlan ............ H01L 31/02168 |
| | | | 136/256 |
| 5,122,215 A | | 6/1992 | Shibata et al. |
| 5,554,229 A | * | 9/1996 | Vogeli ............ H01L 31/022425 |
| | | | 136/256 |
| 6,473,220 B1 | * | 10/2002 | Clikeman ................ G02B 5/20 |
| | | | 359/245 |
| 6,573,445 B1 | | 6/2003 | Burgers |
| 6,768,048 B2 | | 7/2004 | Woll et al. |
| 7,573,550 B2 | * | 8/2009 | Lubart .................. G02B 6/0053 |
| | | | 349/113 |
| 7,595,934 B2 | * | 9/2009 | Lubart ............... G02B 27/0972 |
| | | | 359/641 |
| 8,202,566 B2 | | 6/2012 | Davidson et al. |
| 8,648,248 B2 | * | 2/2014 | Rodriguez-Parada ..................... |
| | | | H01L 31/048 |
| | | | 136/246 |
| 9,750,141 B2 | | 8/2017 | Noy |
| 10,036,093 B2 | | 7/2018 | Chueh et al. |
| 10,062,520 B2 | | 8/2018 | Kitagawa et al. |
| 10,119,197 B2 | | 11/2018 | Alibabaei et al. |
| 10,202,695 B2 | | 2/2019 | Schwartz |
| 10,242,806 B2 | | 3/2019 | Lewis et al. |
| 10,700,234 B2 | * | 6/2020 | Saive ............... H01L 31/022425 |
| 2003/0041894 A1 | | 3/2003 | Sverdrup, Jr. et al. |
| 2005/0109388 A1 | | 5/2005 | Murakami et al. |
| 2006/0038182 A1 | | 2/2006 | Rogers et al. |
| 2006/0139725 A1 | | 6/2006 | Kai et al. |
| 2006/0207647 A1 | | 9/2006 | Tsakalakos et al. |
| 2006/0283498 A1 | | 12/2006 | Gronet |
| 2007/0281099 A1 | | 12/2007 | Howarth et al. |
| 2008/0072958 A1 | | 3/2008 | Dutta |
| 2008/0135089 A1 | | 6/2008 | Tsakalakos et al. |
| 2008/0176030 A1 | | 7/2008 | Fonash et al. |
| 2008/0271776 A1 | * | 11/2008 | Morgan ............. G02B 19/0028 |
| | | | 136/246 |
| 2009/0061213 A1 | | 3/2009 | Bahnmuller et al. |
| 2009/0078303 A1 | | 3/2009 | Brezoczky et al. |
| 2009/0165844 A1 | | 7/2009 | Dutta |
| 2009/0221111 A1 | * | 9/2009 | Frolov ............... H01L 31/03926 |
| | | | 438/65 |
| 2009/0229667 A1 | | 9/2009 | Shrotriya et al. |
| 2009/0255568 A1 | * | 10/2009 | Morgan .................. F24S 23/10 |
| | | | 136/246 |
| 2009/0293946 A1 | | 12/2009 | Lin et al. |
| 2010/0055824 A1 | | 3/2010 | Lin et al. |
| 2010/0075261 A1 | | 3/2010 | Clevenger et al. |
| 2010/0079845 A1 | | 4/2010 | Wang et al. |
| 2010/0089262 A1 | | 4/2010 | Seong et al. |
| 2010/0116316 A1 | | 5/2010 | Moslehi et al. |
| 2010/0283069 A1 | | 11/2010 | Rogers et al. |
| 2011/0120527 A1 | | 5/2011 | Huang et al. |
| 2011/0175085 A1 | | 7/2011 | Tiwari et al. |
| 2011/0240104 A1 | | 10/2011 | Lee et al. |
| 2011/0315201 A1 | | 12/2011 | Lin et al. |
| 2012/0067400 A1 | | 3/2012 | Derryberry et al. |
| 2012/0067402 A1 | * | 3/2012 | Kitai ..................... G02B 5/045 |
| | | | 136/246 |
| 2012/0154921 A1 | | 6/2012 | Yoshida et al. |
| 2012/0229907 A1 | * | 9/2012 | Ueda ................... G02B 5/0278 |
| | | | 359/609 |
| 2013/0014811 A1 | | 1/2013 | Bedell et al. |
| 2013/0074918 A1 | * | 3/2013 | Jeong ..................... C03C 27/06 |
| | | | 136/256 |
| 2013/0125974 A1 | | 5/2013 | Kong et al. |
| 2013/0210185 A1 | | 8/2013 | Yoshimi et al. |
| 2014/0000692 A1 | * | 1/2014 | Fogel .............. H01L 31/022483 |
| | | | 136/256 |
| 2014/0029104 A1 | | 1/2014 | Guo et al. |
| 2014/0130864 A1 | | 5/2014 | Lunt et al. |
| 2014/0182656 A1 | | 7/2014 | Bodan et al. |
| 2014/0283896 A1 | | 9/2014 | Lunt et al. |
| 2014/0299181 A1 | | 10/2014 | Bedell et al. |
| 2015/0200320 A1 | | 7/2015 | Martorell et al. |
| 2015/0311370 A1 | | 10/2015 | Chou et al. |
| 2016/0041656 A1 | | 2/2016 | Bita et al. |
| 2016/0087135 A1 | * | 3/2016 | Horimai ................ G02B 5/283 |
| | | | 136/259 |
| 2016/0302305 A1 | | 10/2016 | Chang et al. |
| 2016/0313640 A1 | | 10/2016 | Cok et al. |
| 2016/0322514 A1 | * | 11/2016 | Atwater .............. H01L 31/0747 |
| 2017/0038047 A1 | | 2/2017 | Golle et al. |
| 2017/0179041 A1 | | 6/2017 | Dias et al. |
| 2017/0263796 A1 | * | 9/2017 | Jahelka ............. H01L 31/02167 |
| 2018/0088431 A1 | | 3/2018 | Holt et al. |
| 2018/0248064 A1 | | 8/2018 | Lunt et al. |
| 2019/0067504 A1 | | 2/2019 | Needell et al. |
| 2019/0074401 A1 | | 3/2019 | Saive et al. |
| 2019/0148574 A1 | * | 5/2019 | Saive ................ H01L 31/02366 |
| | | | 136/256 |
| 2019/0312168 A1 | | 10/2019 | Jahelka et al. |
| 2019/0326460 A1 | | 10/2019 | Needell et al. |
| 2020/0028005 A1 | | 1/2020 | Saive et al. |
| 2020/0152821 A1 | | 5/2020 | Saive et al. |
| 2020/0241186 A1 | * | 7/2020 | Ohta ...................... G02B 5/282 |
| 2020/0308717 A1 | | 10/2020 | Cheng et al. |

FOREIGN PATENT DOCUMENTS

| | | |
|---|---|---|
| DE | 112018004186 T8 | 7/2020 |
| KR | 1020200040798 A | 4/2020 |
| WO | 2016111576 A1 | 7/2016 |
| WO | 2019035094 A1 | 2/2019 |
| WO | 2019099733 A1 | 5/2019 |
| WO | 2019139996 A1 | 7/2019 |
| WO | 2019204809 A1 | 10/2019 |
| WO | 2020041522 A1 | 2/2020 |
| WO | 2020205800 A1 | 10/2020 |

OTHER PUBLICATIONS

Saive et al., "Effectively transparent front contacts for optoelectronic devices", Advanced Optical Materials, Jun. 10, 2016, vol. 4, No. 10, pp. 1470-1474, doi: 10.1002/adom.201600252.
Saive et al., "Enhancing the Power Output of Bifacial Solar Modules by Applying Effectively Transparent Contacts (ETCs) With Light Trapping", IEEE Journal of Photovoltaics, Sep. 2018, vol. 8, No. 5, pp. 1183-1189.
Saive et al., "Silicon heterojunction solar cells with effectively transparent front contacts", Sustainable Energy & Fuels, 2017, vol. 1, pp. 593-598.
Saive et al., "Effectively Transparent Contacts (ETCs) for Solar Cells", IEEE 43rd Photovoltaic Specialists Conference, Date of Conference: Jun. 5-10, 2016, Portland, Oregon, 4 pgs.

(56) References Cited

OTHER PUBLICATIONS

Saive et al., "Enhanced Light Trapping in Thin Silicon Solar Cells using Effectively Transparent Contacts (ETCs)", 44th IEEE Photovoltaic Specialist Conferences, Aug. 2017, 5 pgs.

Saive et al., "Light Trapping in Bifacial Solar Modules Using Effectively Transparent Contacts (ETCs)", 45th IEEE Photovoltaic Specialist Conference, Aug. 2018, 3 pgs.

Saive et al., "Mesoscale trumps nanoscale: metallic mesoscale contact morphology for improved light trapping, optical absorption and grid conductance in silicon solar cells", Optics Express, vol. 26, No. 6, Mar. 19, 2018, 8 pgs.

Saive et al., "Three-dimensional nanoimprint lithography using two-photon lithography master samples", ArVix, Feb. 2017, 4 pgs.

Saive et al., "Transparent, Conductive and Lightweight Superstrates for Perovskite Solar Cells and Modules", 45th IEEE Photovoltaic Specialist Conference, Aug. 2018, 5 pgs.

Sanyo Energy Corp, "Bifacial Photovoltaic Module", Hit photovoltaic module double, Jan. 9, 2008, 2 pgs.

Sark et al., "Luminescent Solar Concentrators: The route to 10% efficiency", IEEE Photovoltaic Specialist Conference, Jun. 8-13, 2014, pp. 2276-2278.

Schneider et al., "Solar Cell Efficiency Improvement by New Metallization Techniques—the Day4 Electrode Concept", Proceedings of the IEEE 4th World Conference on Photovoltaic Energy Conference, Waikoloa, Hawaii, May 7-12, 2006, 4 pgs.

Sheldon et al., "Evaluation of ITO/GaAs solar cells", Journal of Vacuum Science and Technology, 1982, vol. 20, No. 3, pp. 410-413, doi: 10.1116/1.571479.

Shockley et al., "Detailed Balance Limit of Efficiency of p-n Junction Solar Cells", Journal of Applied Physics, vol. 32, No. 3, Mar. 1961, pp. 510-519.

Sholin et al., "Semiconducting polymers and quantum dots in luminescent solar concentrators for solar energy harvesting", Journal of Applied Physics, vol. 101, No. 12, Jun. 28, 2007, pp. 123114-1-123114-9.

Slooff et al., "A Luminescent Solar Concentrator with 7.1% power conversion efficiency", Phys. Status Solid—Rapid Res. Letter, vol. 2, No. 6, 2008, pp. 257-259, published online Sep. 6, 2008.

Soderstrom et al., "Smart Wire Connection Technology", 28th European Photovoltaic Solar Energy Conference and Exhibition, Session 1CV.2.17, 2013, pp. 495-499.

Soderstrom et al., "Smart Wire Connection Technology", Meyer Burger, Retrieved from: https://www.meyerburger.com/user_upload/dashboard_news_bundle/376409e022f7d2ae6f6e29318f8055410774c7fd.pdf, 12 pgs.

Soria et al., "A study of the annual performance of bifacial photovoltaic modules in the case of vertical facade integration", Energy Science & Engineering, vol. 4, No. 1, Nov. 26, 2015, pp. 52-68.

Sze et al., "Physics of semiconductor devices", Hoboken, NJ, Wiley-Interscience, 2007, 763 pgs. (presented in three parts).

Taguchi et al., "24.7% record efficiency HIT solar cell on thin silicon wafer", IEEE Journal of Photovoltaics, Jan. 2014, vol. 4, pp. 96-99.

Unknown Author, "Bright Green Tree—Waikato", https://commons.wikimedia.org/wiki/File:Bright_green_tree_-_Waikato.jpg, 2005, 2 pgs.

Valdivia et al., "Bifacial Photovoltaic Module Energy Yield Calculation and Analysis", IEEE PVSC 2017 Conference Proceedings, 2017, pp. 1094-1099.

Van Dam et al., "High-Efficiency Nanowire Solar Cells with Omnidirectionally Enhanced Absorption Due to Self-Aligned Indium-Tin-Oxide Mie Scatterers", ACA Nano, Nov. 29, 2016, vol. 10, No. 12, pp. 11414-11419, doi: 10.1021/acsnano.6b06874.

Van De Groep et al., "Transparent Conducting Silver Nanowire Networks", Nano Letters, May 3, 2012, vol. 12, pp. 3138-3144, doi:10.1021/n1301045a.

Vest et al., "Levelized Cost and Levelized Avoided Cost of New Generation Resources in the Annual Energy Outlook 2016", U.S. Energy Information Administration, Aug. 2016, 20 pgs.

Vogt, "Development of Physical Models for the Simulation of Optical Properties of Solar Cell Modules", Hannover, Leibniz Information Centre For Science and Technology University Library, Thesis, 2015, 161 pgs.

Vogt et al., "Measurement of the Optical Constants of Soda-Lime Glasses in Dependence of Iron Content and Modeling of Iron-Related Power Losses in Crystalline Si Solar Cell Modules", IEEE Journal of Photovoltaics, vol. 6, No. 1, Nov. 19, 2015, pp. 111-118.

Vogt et al., "Optical Constants of UV Transparent EVA and the Impact on the PV Module Output Power under Realistic Irradiation", Energy Procedia, vol. 92, Aug. 2016, pp. 523-530.

Wallentin et al., "InP Nanowire Array Solar Cells Achieving 13.8% Efficiency by Exceeding the Ray Optics Limit", Science, Mar. 1, 2013, vol. 339, No. 6123, pp. 1057-1060, doi: 10.1126/science.1230969.

Wang et al., "Image quality assessment: from error visibility to structural similarity", IEEE transactions on image processing, Apr. 2004, vol. 13, No. 4, pp. 600-612.

Ward et al., "High aspect ratio electrodeposited Ni/Au contacts for GaAs-based III-V concentrator solar cells", Progress in Photovoltaics: Research and Applications, No. 23, 2015, Published online Mar. 20, 2014, pp. 646-653.

Wheeler et al., "Switchable Photovoltaic Windows Enabled by Reversible Photothermal Complex Dissociate from Methylammonium Lead Iodide", Nature Communications, vol. 8, No. 1722, 2017, pp. 1-9.

Wittwer et al., "Fluorescent Planar Concentrators", Solar Energy Materials and Solar Cells, vol. 11, No. 3, 1984, pp. 187-197.

Woodhouse et al., "A Manufacturing Cost Analysis Relevant to Single- and Dual-Junction Photovoltaic Cells Fabricated with III-Vs and III-Vs Grown on Czochralski Silicon", National Renewable Energy Lab, Sep. 30, 2013, 92 pgs.

Wurfel et al., "Charge Carrier Separation in Solar Cells", IEEE Journal of Photovoltaics, Nov. 20, 2014, vol. 5, No. 1, pp. 461-469, doi: 10.1109/JPHOTOV.2014.2363550.

Xie et al., "InAs/InP/ZnSe core.shell/shell quantum dots as near-infrared emitters: Bright, narrow-band, non-cadmium containing, and biocompatible", Nano Research, vol. 1, No. 6, 2008, pp. 457-464.

Yablonovitch, "Statistical ray optics", Journal of the Optical Society of America, vol. 72, No. 7, Jul. 1982, pp. 899-907.

Yablonovitch, "Thermodynamics of the fluorescent planar concentrator", Journal of the Optical Society of America, vol. 70, No. 11, Nov. 1980, pp. 1362-1363.

Yin et al., "19.2% Efficient InP Heterojunction Solar Cell with Electron-Selective TiO2 Contact", ACS Photonics, Sep. 25, 2014, vol. 1, No. 12, pp. 1245-1250, doi: 10.1021/ph500153c.

Yu et al., "Selecting tandem partners for silicon solar cells", Nature Energy, Nov. 2016, vol. 1, No. 11, Article 16137, pp. 1-4, published Sep. 26, 2016, doi: 10.1038/nenergy.2016.137.

Yusufoglu et al., "Analysis of the Annual Performance of Bifacial Modules and Optimization Methods", IEEE Journal of Photovoltaics, vol. 5, No. 1, Nov. 20, 2014, pp. 320-328.

Zheng et al., "Graphene oxide-based transparent conductive films", Progress in Materials Science, Mar. 25, 2014, vol. 64, pp. 200-247.

Zhou et al., "Near Infrared, Highly Efficient Luminescent Solar Concentrators", Advanced Energy Materials, vol. 6, No. 11, Jun. 8, 2016, pp. 1-8.

Henry et al., "Alumina etch masks for fabrication of high-aspect-ratio silicon micropillars and nanopillars", Nanotechnology, Jun. 2, 2009, vol. 20, 255305, 4 pgs.

Henry, "ICP etching of silicon for micro and nanoscale devices", Thesis, California Institute of Technology, May 19, 2010, 219 pgs., (presented in two parts).

Herasimenka et al., ">750 mV open circuit voltage measured on 50 μm thick silicon heterojunction solar cell", Applied Physics Letters, Aug. 1, 2013, vol. 103, pp. 053511-1-053511-4.

Hinkle et al., "Detection of Ga suboxides and their impact on III-V passivation and Fermi-level pinning", Applied Physics Letters, Apr. 20, 2009, vol. 94, No. 16, pp. 162101-1-162101-3, doi: 10.1063/1.3120546.

(56) References Cited

OTHER PUBLICATIONS

Holman et al., "Current losses at the front of silicon heterojunction solar cells", IEEE Journal of Photovoltaics, Jan. 2012, vol. 2, No. 1, pp. 7-15.

Honsberg et al., PVCDROM, http://pveducation.org/pvcdrom, Jan. 5, 2015, 1 pg.

Horzel et al., "Advantages of a new metallisation structure for the front side of solar cells", 13th European Photovoltaic Solar Energy Conference, Oct. 23-27, 1995, pp. 1368-1373.

Hoye et al., "Strongly Enhanced Photovoltaic Performance and Defect Physics of Air-Stable Bismuth Oxyiodide (BiOI)", Advanced Materials, Jul. 17, 2017, vol. 29, No. 36, 1702176, 10 pgs., doi: 10.1002/adma.201702176.

Hsu et al., "Performance enhancement of metal nanowire transparent conducting electrodes by mesoscale metal wires", Nature Communications, Sep. 25, 2013, vol. 4, No. 2522, pp. 1-7.

Hu et al., "Ray-trace simulation of CuInS(Se)_2 quantum dot based luminescent solar concentrators", Optics Express, vol. 23, No. 15, Jul. 27, 2015, pp. A858-A867.

Huang et al., "Fabrication of Silicon Nanowire Arrays with Controlled Diameter, Length, and Density", Advanced Materials, Feb. 7, 2007, vol. 19, No. 5, pp. 744-748, doi: 10.1002/adma.200600892.

Jasieniak et al., "Re-examination of the Size-Dependent Absorption Properties of CdSe Quantum Dots", Journal of Physical Chemistry, vol. 113, No. 45, Oct. 15, 2009, pp. 19468-19474.

Jiang et al., "Enhanced electron extraction using SnO2 for high efficiency planar-structure HC(NH2)2PbI3-based perovskite solar cells", Nature Energy, Nov. 14, 2016, vol. 2, Issue 16177, 7 pgs., doi: 10.1038/nenergy.2016.177.

Kelzenberg, "Silicon microwire photovoltaics", Thesis, California Institute of Technology, May 19, 2010, 324 pgs., (presented in two parts).

Kik et al., "Catoptric electrodes: transparent metal electrodes using shaped surfaces", Optics Letters, vol. 39, No. 17, Sep. 1, 2014, pp. 5114-5117.

King, "Photovoltaic Module and Array Performance Characterization Methods for All System Operating Conditions", AIP Conference Proceedings, vol. 394, No. 1, May 12, 2008, 22 pgs.

Klein et al., "Transparent Conductive Adhesives for Tandem Solar Cells Using Polymer—Particle Composites", ACS Applied Materials & Interfaces, 2008, No. 10, pp. 8086-8091.

Kopecek et al., "Bifaciality: One small step for technology, one giant leap for kWh cost reduction", Photovoltaics International, vol. 26, 2014, 11 pgs.

Kreinin et al., "PV systems based on bifacial modules: Performance simulation vs. design factors", IEEE 43rd Photovoltaic Specialists Conference (PVSC), Portland, Oregon, Jun. 5-10, 2016, pp. 2688-2691.

Krenzinger et al., "Estimation of Radiation Incident on Bifacial Albedo-Collecting Panels", International Journal of Solar Energy, vol. 4, No. 5, 1986, pp. 297-319.

Kuang et al., "A New Architecture for Transparent Electrodes: Relieving the Trade-Off Between Electrical Conductivity and Optical Transmittance", Advanced Materials, No. 23, 2011, pp. 2469-2473.

Lai et al., "Schottky Barrier Catalysis Mechanism in Metal-Assisted Chemical Etching of Silicon", ACS Applied Materials & Interfaces, Mar. 28, 2016, vol. 8, No. 14, pp. 8875-8879. doi: 10.1021/acsami.6b01020.

Levy et al., "Rapid and precise calculations of energy and particle flux for detailed-balance photovoltaic applications", Solid-State Electronics, vol. 50, No. 7-8, Jul.-Aug. 2006, pp. 1400-1405.

Lo et al., "New integrated simulation tool for the optimum design of bifacial solar panel with reflectors on a specific site", Renewable Energy, vol. 81, Sep. 2015, pp. 293-307.

Lohmuller et al., "The HIP-MWT+ solar cell concept on n-type silicon and metallization-induced voltage losses", 29th European PV Solar Energy Conference and Exhibition, Amsterdam, The Netherlands, Sep. 22-26, 2014, 7 pgs.

Lossen et al., "Double Printing nPERT Cells with Narrow Contact Layers", Energy Procedia, vol. 92, Aug. 2016, pp. 939-948.

Ma et al., "Enhancement of photovoltaic cell response due to high-refractive-index encapsulants", Journal of Applied Physics, Aug. 18, 2010, vol. 108, pp. 043102-1-043102-3, http://www.ecse.rpiscrews.us/~schubert/Reprints/2010-Ma-Ming-et-al-%28JAP%29-Enhancement-of-photovoltaic-cell-response-due-to-high-refractive-index-encapsulants.pdf.

Madrid et al., "Investigation of the Efficiency Boost Due to Spectral Concentration in a Quantum-Dot Based Luminescent Concentrator", IEEE World Conference on Photovoltaic Energy Conference, May 7-12, 2006, pp. 154-157.

Martinez et al., "Design, fabrication, and characterization of a luminescent solar concentrator with optimized optical concentration through minimization of optical losses", Journal of Photonics for Energy, vol. 6, No. 4, Nov. 30, 2016, pp. 045504-1-045501-11.

Masuko et al., "Achievement of more than 25% conversion efficiency with crystalline silicon heterojunction solar cell", IEEE Journal of Photovoltaics, Nov. 2014, vol. 4, pp. 1433-1435.

McIntosh et al., "OPAL 2: Rapid Optical Simulation of Silicon Solar Cells", 38th IEEE Photovoltaic Specialists Conference, Austin, Texas, Jun. 3-8, 2012, 8 pgs.

Meinardi et al., "Highly efficient luminescent solar concentrators based on earth-abundant indirect-bandgap silicon quantum dots", Nature Photonics, vol. 11, No. 3, Mar. 1, 2017, pp. 177-185.

Meinardi et al., "Large-area luminescent solar concentrators based on 'Stokes-shift-engineered' nanocrystals in a mass-polymerized PMMA matrix", Nature Photonics, vol. 8, No. 5, Apr. 13, 2014, pp. 392-399.

Mittag et al., "Triangular Ribbons for Improved Module Efficiency", 32nd European PV Solar Energy Conference and Exhibition, Jun. 20-24, 2016, Munich, Germany, 4 pgs.

Morales-Masis et al., "Transparent electrodes for efficient optoelectronics", Advanced Electronic Materials, vol. 3, No. 5 (2017): 1600529, 17 pgs.

Myers et al., "Visual appearance of microcontacts for solar windows", Journal of Photonics for Energy, vol. 9, No. 2, May 13, 2019, 10 pgs.

Narasimhan et al., "Hybrid Metal—Semiconductor Nanostructure for Ultrahigh Optical Absorption and Low Electrical Resistance at Optoelectronic Interfaces", ACS Nano, vol. 9, No. 11, Oct. 8, 2015, pp. 10590-10597.

Needell et al., "Micro-optical Tandem Luminescent Solar Concentrators", arXiv:1710.00034v1, Sep. 5, 2017, 10 pgs.

Niu et al., "High order diffraction suppression by quasi-periodic two-dimensional gratings", Optical Materials Express, Feb. 1, 2017, vol. 7, No. 2, pp. 366-375, doi: 10.1364/OME.7.000366.

Padmanabhan et al., "Light-induced degradation and regeneration of multicrystalline silicon Al-BSF and PERC solar cells", Physica Status Solidi: Rapid Research Letters, vol. 10, No. 12, Dec. 2016, Online Publication: Nov. 16, 2016, pp. 874-881.

Papakonstantinou et al., "Fundamental limits of concentration in luminescent solar concentrators revised: the effect of reabsorption and nonunity quantum yield", Optica, vol. 2, No. 10, Oct. 2015, pp. 841-849.

Papet et al., "19% Efficiency Module Based on Roth & Rau Heterojunction Solar Cells and Day4™ Energy Module Concept", 26th European Photovoltaic Solar Energy Conference and Exhibition, Session 4AV.1.13, 2011, pp. 3336-3339.

Powell et al., "The capital intensity of photovoltaics manufacturing: barrier to scale and opportunity for innovation", Energy & Environmental Science, 2015, vol. 8, No. 12, pp. 3395-3408, doi: 10.1039/C5EE01509J.

Rahman et al., "Efficient tool flow for 3D photovoltaic modelling", Computer Physics Communications, Mar. 30, 2015, vol. 193, pp. 124-130, doi: 10.1016/j.cpc.2015.03.016.

Rau et al., "Thermodynamics of light management in photovoltaic devices", Physical Review B, vol. 90, No. 3, Jul. 15, 2014, pp. 035211-1-035211-16.

Ravikumar, "Photovoltaic Capacity Additions: The optimal rate of deployment with sensitivity to time-based GHG emissions", Masters Thesis, Dec. 2013, Arizona State University, 50 pgs.

(56) References Cited

OTHER PUBLICATIONS

Richards et al., "Overcoming the Poor Short Wavelength Spectral Response of CdS/CdTe Photovoltaic Modules via Luminescence Down-Shifting: Ray-Tracing Simulations", Progress in Photovoltaics, vol. 15, No. 1, Jan. 2007, pp. 27-34, published online Sep. 20, 2006.
Rodriguez, "Bifacial solar cells—the two sides of the story", Solar Choice News, New Technologies, May 5, 2015, Retrieved from: https://www.solarchoice.net.au/blog/news/bifacial-solar-cells-the-two-sides-of-the-story-050515, 7 pgs.
Romer et al., "Ion Implantation for Poly-Si Passivated Back-Junction Back-Contacted Solar Cells", IEEE Journal of Photovoltaics, vol. 5, No. 2, Mar. 2015, pp. 507-514.
Rowan et al., "Advanced Material Concepts for Luminescent Solar Concentrators", IEEE Journal of Selected Topics in Quantum Electronics, vol. 14, No. 5, Nov. 2008, pp. 1312-1322.
Rowell et al., "Transparent electrode requirements for thin film solar cell modules", Energy & Environmental Science, 2011, vol. 4, pp. 131-134.
Russell et al., "The Influence of Spectral Albedo on Bifacial Solar Cells: A Theoretical and Experimental Study", IEEE Journal of Photovoltaics, vol. 7, No. 6, Nov. 2017, pp. 1611-1618.
International Search Report and Written Opinion for International Application No. PCT/US2019/012916, Search completed May 3, 2019, dated May 7, 2019, 10 Pgs.
International Search Report and Written Opinion for International Application No. PCT/IB2018/056249, Search completed Nov. 8, 2018, dated Dec. 20, 2018, 14 Pgs.
International Search Report and Written Opinion for International Application No. PCT/US2019/028522, Search completed Sep. 4, 2019, dated Sep. 4, 2019, 8 Pgs.
International Search Report and Written Opinion for International Application No. PCT/US2019/047576, Search completed Oct. 22, 2019, dated Nov. 8, 2019, 15 Pgs.
International Search Report and Written Opinion for International Application No. PCT/US2018/061373, Search completed Mar. 6, 2019, dated Mar. 7, 2019, 10 Pgs.
"LCR-XP™ Data Sheet", Ulbrich Solar Technologies, Retrieved from: https://www.pvribbon.com/technology/lcr-xp-data-sheet/, 3 pgs.
Aberg et al., "A GaAs Nanowire Array Solar Cell With 15.3% Efficiency at 1 Sun", IEEE Journal of Photovoltaics, Oct. 14, 2015, vol. 6, No. 1, pp. 185-190, doi: 10.1109/JPHOTOV.2015.2484967.
Adams et al., "Are global wind power resource estimates overstated?", Environmental Research Letters, Feb. 25, 2013, vol. 8, No. 1, 15021, 9 pgs, doi: 10.1088/1748-9326/8/1/015021.
Afshinmanesh et al., "Transparent metallic fractal electrodes for semiconductor devices", Nano letters, Aug. 20, 2014, vol. 14, pp. 5068-5074.
Andrews et al., "The Effect of Spectral Albedo on Amorphous Silicon and Crystalline Silicon Solar Photovoltaic Device Performance", Solar Energy, vol. 91, Mar. 22, 2013, pp. 233-241.
Arora et al., "Perovskite solar cells with CuSCN hole extraction layers yield stabilized efficiencies greater than 20%", Science, Nov. 10, 2017, vol. 358, No. 6364, pp. 768-771, doi: 10.1126/science.aam5655.
Arvo, "Backward ray tracing", Developments in Ray Tracing, Computer Graphics, Proc. of ACM SIGGRAPH 86 Course Notes, 1986, pp. 259-263.
Baruch et al., "On some thermodynamic aspects of photovoltaic solar energy conversion", Solar Energy Materials and Solar Cells, vol. 36, No. 2, Feb. 1995, pp. 201-222.
Batchelder et al., "The Luminescent Solar Concentrator", Thesis, California Institute of Technology, 1982, 287 pgs.
Blakers, "Shading losses of solar-cell metal grids", Journal of Applied Physics, May 15, 1992, vol. 71, No. 10, pp. 5237-5241, published online Jun. 4, 1998.
Bomm et al., "Fabrication and spectroscopic studies on highly luminescent CdSe/CdS nanorod polymer composites", Beilstein Journal of Nanotechnology, vol. 1, No. 1, Nov. 29, 2010, pp. 94-100.

Brennan et al., "Effects of Spectral Albedo on Solar Photovoltaic Devices", Solar Energy Materials and Solar Cells, vol. 124, Feb. 19, 2014, pp. 111-116.
Bronstein et al., "Luminescent Solar Concentration with Semiconductor Nanorods and Transfer-Printed Micro-Silicon Solar Cells", ACS Nano, vol. 8, No. 1, Jan. 28, 2014, pp. 44-53.
Bronstein et al., "Quantum Dot Luminescent Concentrator Cavity Exhibiting 30-fold Concentration", ACS Phototonics, vol. 2, No. 11, Aug. 17, 2015, pp. 1576-1583.
Burgers, "How to Design Optimal Metallization Patterns for Solar Cells", Progress in Photovoltaics: Research and Applications, May 4, 1999, vol. 7, pp. 457-461, http://www.ecn.nl/docs/library/report/1999/rx99023.pdf.
Carlson et al., "Transfer printing techniques for materials assembly and micro/nanodevice fabrication", Advanced Materials, vol. 24, No. 39, Oct. 9, 2012, Electronic Publication: Aug. 31, 2012, pp. 5284-5318.
Chen et al., "Compact high-quality CdSe-CdS core-shell nanocrystals with narrow emission linewidths and suppressed blinking", NIH Public Access: Author Manuscript, May 2014, 14 pgs, Published as: Nature Materials, vol. 12, No. 5, May 2013, Electronic Publication: Feb. 3, 2013, pp. 445-451.
Chen et al., "Increasing light capture in silicon solar cells with encapsulants incorporating air prisms to reduce metallic contact losses", Optics Express, vol. 24, No. 22, Oct. 31, 2016, published Sep. 30, 2016, 12 pgs.
Coropceanu et al., "Core/shell quantum dot based luminescent solar concentrators with reduced reabsorption and enhanced efficiency", Nano Letters, vol. 14, No. 7, Jul. 9, 2014, Electronic Publication: Jun. 6, 2014, pp. 4097-4101.
Cuevas et al., "50 Per cent more output power from an albedo-collecting flat panel using bifacial solar cells", Solar Energy, vol. 29, No. 5, 1982, pp. 419-420.
De Souza et al., "Inversion mode n-channel GaAs field effect transistor with high-k/metal gate", Applied Physics Letters, Apr. 16, 2008, vol. 92, No. 15, pp. 153508-1-153508-2, https://doi.org/10.1063/1.2912027.
Debije et al., "Thirty Years of Luminescent Solar Concentrator Research: Solar Energy for the Built Environment", Advanced Energy Materials, vol. 2, No. 1, 2012, pp. 12-35.
Deline et al., "Evaluation and Field Assessment of Bifacial Photovoltaic Module Power Rating Methodologies", IEEE 43rd Photovoltaic Specialists Conference (PVSC), Portland, Oregon, Jun. 5-10, 2016, 6 pgs.
Divitt et al., "Spatial coherence of sunlight and its implications for light management in photovoltaics", Optica, Jan. 27, 2015, vol. 2, No. 2, pp. 95-103, doi: 10.1364/OPTICA.2.000095.
Ellmer, "Past achievements and future challenges in the development of optically transparent electrodes", Nature Photonics, Nov. 30, 2012, vol. 6, pp. 809-817.
Essig et al., "Mechanically stacked 4-terminal III-V/Si tandem solar cells", Conference paper, Jun. 2017, 2 pgs.
Essig et al., "Realization of GaInP/Si dual-junction solar cells with 29.8% one-sun efficiency", IEEE Journal of Photovoltaics, vol. 6, No. 4, Jul. 2016, Date of Publication: Apr. 27, 2016, 7 pgs.
Feldmann et al., "Carrier-selective contacts for Si solar cells", Applied Physics Letters, vol. 104, No. 18, May 8, 2014, pp. 181105-1-181105-4.
Ferry et al., "Light trapping in ultrathin plasmonic solar cells", Optics Express, Jun. 21, 2010, vol. 18, No. 102, pp. A237-A245.
Fertig et al., "Bifacial potential of single- and double-sided collecting silicon solar cells", Progress in Photovoltaics: Research and Applications, vol. 24, No. 6, Jan. 13, 2016, pp. 818-829.
Fertig et al., "Economic feasibility of bifacial silicon solar cells", Progress in Photovoltaics: Research and Applications, vol. 24, No. 6, Jan. 14, 2016, pp. 800-817.
Fraunhofer, "Photovoltaics Report", Fraunhofer ISE, Freiburg, Jul. 12, 2017, 44 pgs.
Gallagher et al., "Quantum dot solar concentrator behaviour, predicted using a ray trace approach", International Journal of Ambient Energy, vol. 25, No. 1, Jan. 2004, pp. 47-56.
Gangopadhyay et al., "Front Grid Design For Plated Contact Solar Cells", IEEE, 399-402, 2002.

(56) References Cited

OTHER PUBLICATIONS

Geisz et al., "Enhanced external radiative efficiency for 20.8% efficient single-junction GaInP solar cells", Applied Physical Letters, vol. 103, No. 4, Jul. 25, 2013, pp. 041118-1-041118-5.
Goetzberger et al., "Solar Energy Conversion with Fluorescent Collectors", Applied Physics, vol. 14, No. 2, Oct. 1977, pp. 123-129.
Goldschmidt et al., "Increasing the efficiency of fluorescent concentrator systems", Solar Energy Materials and Solar Cells, vol. 93, No. 2, Feb. 2009, pp. 176-182, available online Nov. 20, 2008.
Goncharov et al., "Reconstruction of the optical system of the human eye with reverse ray-tracing", Optics express, Feb. 4, 2008, vol. 16, No. 3, pp. 1692-1703.
Green, "Self-consistent optical parameters of intrinsic silicon at 300 K including temperature coefficients", Solar Energy Materials and Solar Cells, vol. 92, No. 11, Nov. 2008, pp. 1305-1310.
Guerrero-Lemus et al., "Bifacial solar photovoltaics—A technology review", Renewable and Sustainable Energy Reviews, Mar. 8, 2016, vol. 60, pp. 1533-1549.
Guo et al., "Vertically mounted bifacial photovoltaic modules: A global analysis", Energy, vol. 61, Nov. 1, 2013, pp. 447-454, available online Sep. 23, 2013.
Gutmann et al., "Predicting the performance of photonic luminescent solar concentrators", IEEE Photovoltaic Specialists Conference, Jun. 16-21, 2013, pp. 1864-1868.
Hansen et al., "Analysis of Irradiance Models for Bifacial PV Modules", IEEE 43rd Photovoltaic Specialists Conference (PVSC), Portland, Oregon, Jun. 5-10, 2016, 6 pgs.
International Preliminary Report on Patentability for International Application PCT/IB2018/056249, Report issued Feb. 18, 2020, dated Feb. 27, 2020, 8 pgs.
International Preliminary Report on Patentability for International Application No. PCT/US2019/012916, Report issued Jul. 14, 2020, dated Jul. 23, 2020, 7 Pgs.
International Preliminary Report on Patentability for International Application PCT/US2018/061373, Report issued May 19, 2020, dated May 28, 2020, 08 pgs.
International Preliminary Report on Patentability for International Application PCT/US2019/028522, Report issued Oct. 20, 2020, dated Oct. 29, 2020, 6 pgs.
International Search Report and Written Opinion for International Application No. PCT/US2020/025834, completed Jul. 16, 2020, dated Jul. 17, 2020, 7 pgs.
Arai et al. "A monolithic device for CO2 photoreduction to generate liquid organic substances in a single-compartment reactor", Energy & Environmental Science, 2015, vol. 8, pp. 1898-2002, DOI: 10.1039/c5ee01314c.
Cheng et al. "Monolithic Photoelectrochemical Device for Direct Water Splitting with 19% Efficiency", ACS Energy Letters, vol. 3, No. 8, Jun. 25, 2018, pp. 1795-1800.
Choi et al. "Sn-Coupled p-Si Nanowire Arrays for Solar Formate Production from CO2", Advanced Energy Materials, 2014, vol. 4, No. 11, 1301614, https://doi.org/10.1002/aenm.201301614.
Cotal et al. "III-V multijunction solar cells for concentrating photovoltaics", Energy & Environmental Science, 2009, vol. 2, pp. 174-192, first published as an Advance Article on the web Dec. 10, 2008, DOI: 10.1039/b809257e.
Gurudayal et al. "Efficient solar-driven electrochemical CO2 reduction to hydrocarbons and oxygenates", Energy & Environmental Science, Aug. 31, 2017, vol. 10, pp. 2222-2230, https://doi.org/10.1039/C7EE01764B.
Gurudayal et al. "Si photocathode with Ag-supported dendritic Cu catalyst for CO2 reduction", Energy & Environmental Science, 2019, vol. 12, pp. 1068-1077, doi:10.1039/c8ee03547d.
Kong et al. "Directed Assembly of Nanoparticle Catalysts on Nanowire Photoelectrodes for Photoelectrochemical CO2 Reduction", Nano Letters, Sep. 14, 2016, vol. 16, No. 9. pp. 5675-5680, published online Aug. 5, 2016, doi: 10.1021/acs.nanolett.6b02321.
Law et al. "Recent progress of Spectrolab high-efficiency space solar cells", 38th IEEE Photovoltaic Specialists Conference, Nov. 6, 3023, pp. 3146-3149, DOI:10.1109/PVSC.2012.6318246.
Song et al. "Nanoporous Au Thin Films on Si Photoelectrodes for Selective and Efficient Photoelectrochemical CO2 Reduction", Advanced Energy Materials, Mar. 2017, vol. 7, No. 3, 1, first published Feb. 8, 2017.
Walter et al. "Solar Water Splitting Cells", Chemical Reviews, 2010, vol. 110, pp. 6446-6473.
Zhou et al. "Solar-Driven Reduction of 1 atm of CO2 to Formate at 10% Energy-Conversion Efficiency by use of a TiO2-Protected III-V Tandem Photonode in Conjunction with a Bipolar Membrane and a Pd/C Cathode", ACS Energy Letters, Sep. 9, 2016, vol. 1, No. 4, pp. 764-770, https://doi.org/10.1021/acsenergylett.6b00317.

\* cited by examiner

WINDOWS IMPLEMENTING EFFECTIVELY TRANSPARENT CONDUCTORS AND RELATED METHODS OF MANUFACTURING

CROSS-REFERENCE TO RELATED APPLICATIONS

The current application claims the benefit of and priority under 35 U.S.C. § 119(e) to U.S. Provisional Patent Application No. 62/720,748 entitled "Applications Of Effectively Transparent Contacts In Windows," filed Aug. 21, 2018, and U.S. Provisional Patent Application No. 62/741,631 entitled "Visual Appearance Of Effectively Transparent Contacts For Solar Windows," filed Oct. 5, 2018. The disclosures of U.S. Provisional Patent Application Nos. 62/720,748 and 62/741,631 are hereby incorporated by reference in their entireties for all purposes.

STATEMENT REGARDING FEDERALLY SPONSORED RESEARCH OR DEVELOPMENT

This invention was made with government support under Grant No. EEC1041895 awarded by the National Science Foundation. The government has certain rights in the invention.

FIELD OF THE INVENTION

The present invention generally relates to transparent windows and, more specifically, to windows incorporating effectively transparent conductors.

BACKGROUND

Photovoltaics (PV) refer to a class of methods for converting light into electricity using the photovoltaic effect. Due to technological advances in recent years, photovoltaics are becoming a more viable, carbon-free source of electricity generation. A photovoltaic system typically employs an array of solar cells to generate electrical power. Solar cells can be made of a variety of semiconductors, typically a silicon based structure, acting as a substrate and can include front and rear contacts that are used to conduct current out of the solar cell. The conversion process involves the absorption of light rays by what can be referred to as the active region of the solar cell, which can excite electrons in the substrate into a higher state of energy. The excitation allows the electrons to move as an electric current that can then be extracted to an external circuit and stored.

Silicon photovoltaic (Si-PV) modules currently dominate the solar energy market. Increased progress into Si-PV efficiency enhancements combined with historically low module costs aim to decrease the overall Levelized Cost of Electricity (LCOE) to a point competitive with non-renewable energy sources. Despite recent LCOE reductions, Si-PV technology remains economically inferior to fossil fuels. Additionally, flat-plate Si solar modules generally require geographical locations with high direct normal incidence (DNI) sunlight conditions in order to maintain module performance. Both the strict DNI requirement and the high LCOE of Si-PV cells ultimately limit the dissemination of solar power into the global energy market.

SUMMARY OF THE INVENTION

Systems and methods for transparent materials implementing effectively transparent conductors in accordance with various embodiments of the invention are illustrated. One embodiment includes a window including a first transparent layer of transparent material having a first surface and a second surface, a first plurality of triangular conductors in optical communication with the first transparent layer of glass, wherein each of the first plurality of triangular conductors includes a base side that is parallel to the first surface of the first transparent layer of glass and wherein the first plurality of triangular conductors is configured to redirect a portion of incident light, wherein the portion of incident light travels through both the first surface and the second surface of the first transparent layer of glass.

In another embodiment, the first plurality of triangular contacts is embedded in a first surface of a superstrate layer, wherein the superstrate layer includes a second surface opposite the first surface of the superstrate layer.

In a further embodiment, the first surface of the superstrate layer is disposed adjacent to one of the surfaces of the first transparent layer of glass.

In still another embodiment, the second surface of the superstrate layer is disposed adjacent to one of the surfaces of the first transparent layer of glass.

In a still further embodiment, the window further includes a layer of transparent conductive oxide disposed adjacent to the first surface of the superstrate layer.

In yet another embodiment, the window further includes a plurality of nanostructures disposed on the second surface of the superstrate layer.

In a yet further embodiment, the superstrate layer includes a material selected from the group of: ethylene-vinyl acetate, polyurethane, poly-methyl methacrylate, polydimethylsiloxane, ethylene chlorotrifluoroethylene, and ethylene tetrafluoroethylene.

In another additional embodiment, the first plurality of triangular conductors is embedded within the first transparent layer of glass.

In a further additional embodiment, the window further includes an active absorber layer, wherein the first plurality of triangular contacts is configured to redirect the portion of incident light to towards the active absorber layer.

In another embodiment again, the window further includes a second transparent layer of glass having a first surface and a second surface, wherein the portion of incident light travels through both the first surface and the second surface of the second transparent layer of glass.

In a further embodiment again, the first and second transparent layers of glass form a sealed cell, wherein the sealed cell includes argon gas.

In still yet another embodiment, the first plurality of triangular contacts is disposed within the sealed cell.

In a still yet further embodiment, the first plurality of triangular conductors is affixed onto one of the transparent layers of glass.

In still another additional embodiment, the window further includes a second plurality of triangular contacts disposed within the sealed cell.

In a still further additional embodiment, each of the second plurality of triangular contacts includes a base side that is disposed adjacent the base side of one of the first plurality of triangular contacts.

In still another embodiment again, the window further includes a plurality of nanostructures disposed on one of the surfaces of the first transparent layer of glass.

In a still further embodiment again, the first plurality of triangular contacts includes a metallic nanoparticle ink selected from the group of: silver nanoparticle ink and copper nanoparticle ink.

In yet another additional embodiment, one of the first plurality of triangular contacts includes an aspect ratio that is different than an aspect ratio of another of the first plurality of triangular contacts.

In a yet further additional embodiment, the first plurality of triangular contacts are patterned in a parallel configuration, wherein a pitch between two of the first plurality of triangular contacts is different than a pitch between another two of the first plurality of triangular contacts.

In yet another embodiment again, the window further includes a set of electrodes electrically coupled to the first plurality of triangular contacts.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The description will be more fully understood with reference to the following figures and data graphs, which are presented as exemplary embodiments of the invention and should not be construed as a complete recitation of the scope of the invention.

DETAILED DESCRIPTION

Figure 1:
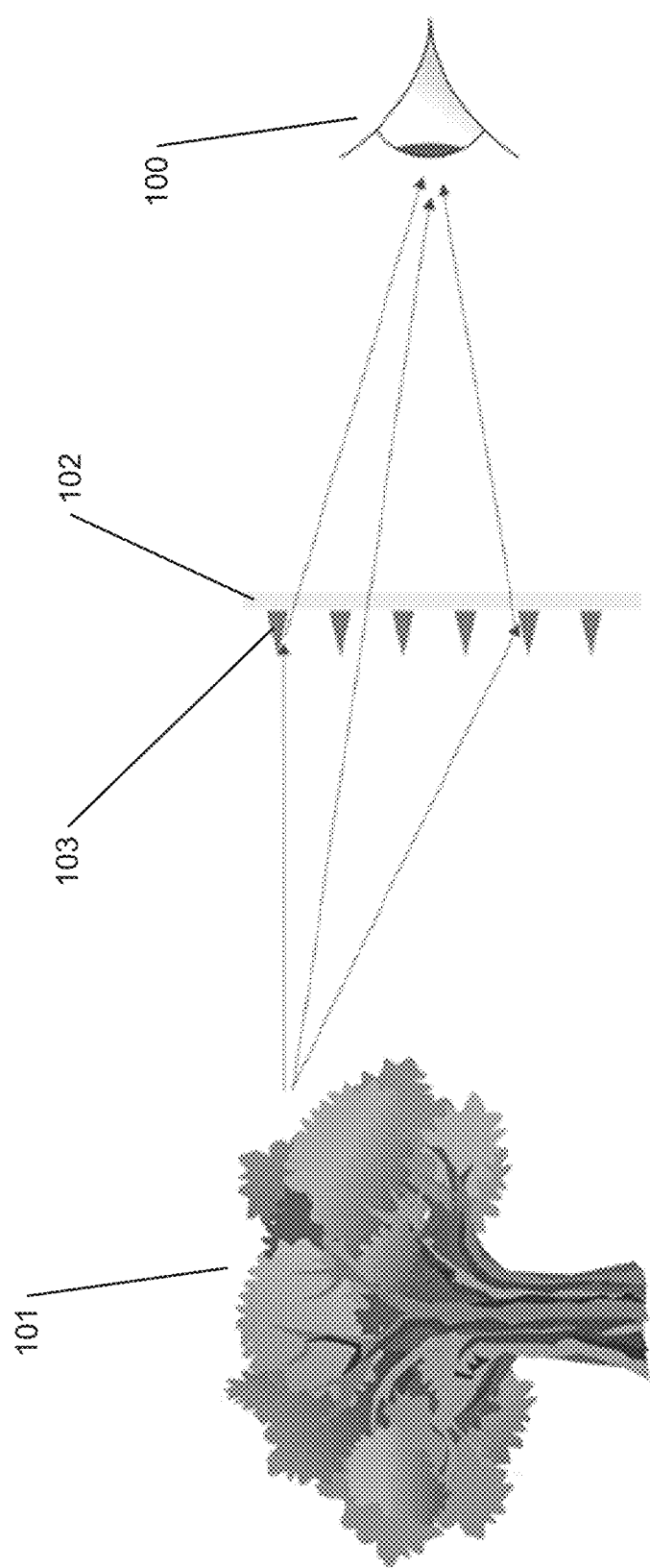
FIG. 1 conceptually illustrates the operation of an ETC window in accordance with an embodiment of the invention.

Optoelectronic devices such as light emitting diodes, photodiodes, and solar cells play an important and expanding role in modern technology. Photovoltaics is one of the largest optoelectronic industry sectors and an ever-increasing component of the world's rapidly growing renewable carbon-free electricity generation infrastructure. In recent years, the photovoltaics field has dramatically expanded owing to the large-scale manufacture of inexpensive crystalline Si and thin film cells and modules. The current record efficiency ($\eta=26.7\%$) Si solar cell utilizes a heterostructure intrinsic thin layer (HIT) design to enable increased open circuit voltage, while more mass-manufacturable solar cell architectures feature front contacts. Thus, improved solar cell front contact designs can be important for future large-scale photovoltaics with even higher efficiency.

Extracting charge carriers efficiently from photovoltaic devices is one of the key challenges the solar industry is facing. In solar cells, either metal contact grids and/or transparent conductive oxides (TCOs) provide lateral conduction paths for charge carriers. In general, a trade-off exists between maximizing light absorption and minimizing electric losses, as metal contacts on the front reflect light and TCOs parasitically absorb light. In conventional solar cells or photodiodes with front and rear contacts, a non-negligible fraction of the incoming solar power is immediately lost at the front contact either through absorption, as in the case of transparent conductive oxides, or through reflection at contact grid fingers. These shading and absorption mechanisms generally lead to about 5-10% of photon loss and contribute to the largest single loss mechanism in commercial solar cells. As a result, many design schemes have been proposed to mitigate front contact losses, such as less absorbing transparent conductive oxides, or less reflective metal contacts such as nanowire grids, fractal contacts, contacts with different shapes, and various other approaches. However, such proposals typically achieve high contact transparency at the expense of reduced conductivity, which in turn leads to series resistance and device electrical losses. For any flat plate solar cell, the front contact design process involves a balance of the grid finger resistance, grid finger shadow loss, and the sheet resistance and absorption losses associated with planar layers that facilitate lateral carrier transport to the grid fingers. For high efficiency silicon heterojunction solar cells, contact design can require a trade-off between grid finger resistance and the sheet resistance and transmission losses of the transparent conducting oxide (TCO)/ amorphous silicon structures coating the cell front surface.

Extracting charge carriers becomes an even bigger challenge in applications where front and/or rear contacts need to be transparent, such as in the case of solar windows. Solar windows are increasingly gaining importance in building integrated photovoltaics (BIPV). Several thin film technologies such as organic and perovskite solar cells have been proposed to act as (semi-) transparent semiconducting absorber layers for such applications. In all cases, transparent conductors are necessary on front and rear side in order to provide the visual appearance desired for window applications. For large windows, the sheet resistance of TCOs alone is not sufficiently low to provide low loss lateral charge transport. Therefore, metal grids typically need to be incorporated. Although the metal gridlines may give a "technical" look to the windows, it is still a compromise on the window's visual appearance, and many customers may not prefer the "technical" appearance of solar cells or wires in the window. In addition, these metal grids can reflect ~4-7% of the incoming light and, thereby, reduce the performance of the solar windows. One solution that can mitigate these optical losses without discriminating on the electrical performance includes the implementation of effectively transparent contacts or effectively transparent conductors (ETCs).

Turning now to the drawings, techniques and applications for achieving high contact transparency implementing ETCs in accordance with various embodiments of the invention are illustrated. ETCs refer to a new design principle that can, depending on the application, overcome shadowing losses and/or parasitic absorption without reducing the conductivity. In many embodiments, the ETCs are micrometer or nanometer-scale grid fingers that can perform as effectively transparent and highly conductive front contacts. In a number of embodiments, the ETCs are implemented in non-PV applications and, thus, are merely performing as conductors. The ETCs can be implemented with a triangular cross-section that can redirect incident light. In PV applications, the ETCs can be configured to redirect incident light, or a portion thereof, towards an active absorber layer surface, which mitigates or eliminates the absorptive and reflective losses described above. Furthermore, the ETCs can be placed close together such that a TCO with reduced thickness can be used—and in some cases, the TCO layer might be omitted completely. In several embodiments, the spacing of the ETCs is ~40 µm. Such designs utilizing effectively transparent triangular cross-section grid fingers rather than conventional front contacts can provide up to ~99.9% of effective optical transparency while ensuring efficient lateral transport corresponding to a sheet resistance of ~4.8Ω sq-1. In many cases, designs utilizing a ~2% area of coverage of effectively transparent triangular cross-section grid fingers can achieve up to ~99.9% of effective optical transparency—i.e., given a surface area, ETCs covering ~2% of the surface area can still allow for up to ~99.9% of the light incident on the surface area to pass (or be directed to an active absorber surface in PV applications). In many cases, ETCs can be implemented at a ~2-5% area coverage and still provide up to 99.9% of effective optical transparency. Such performance would be equivalent to the ETCs themselves being more than 50-80% effectively transparent. In some embodiments, the ETCs cover more than 5% of a substrate's area while providing more than ~99.9% effective optical transparency. In addition to being effectively transparent, ETCs can also support light trapping in thin film and bifacial technology. Thus, ETCs can serve as replacements for both the front grid and the TCO layer used, e.g., in HIT solar cells. Moreover, ETC designs are conceptually general and applicable to any other front-contacted solar cell or optoelectronic device, such as but not limited to InGaP-based solar cells. ETC configurations, applications, ray modeling, and related manufacturing processes of ETC windows are discussed below in further detail.

ETC Windows and Related Applications

ETCs in accordance with various embodiments of the invention can be implemented in a variety of applications. One area includes technologies that enable the integration of ETCs on or within transparent materials (ETC windows). Although this disclosure refers to certain applications as implementing "windows," such a term is meant to be applicable in general to any application implementing transparent materials and is not meant to be limited to windows implemented in buildings, cars, airplanes, etc. For example, in many embodiments, an ETC window can be implemented in mirrors, eyeglasses, goggles, etc. Other applications can include but are not limited to car windshields, windows, airplane windows, bathroom mirrors and windows, shower cabinets, architectural glass, and industrial windows and viewports. In such applications, the ETCs can be incorporated for both PV and non-PV implementations. Transparent materials incorporating ETCs can be implemented by incorporating triangular cross-section metal lines on or within transparent materials, such as but not limited to glass and plastics. The surface of the metal lines can provide high optical reflectivity, and the shape of the lines can ensure that light reflected from the triangular metal sidewalls is largely transmitted through the transparent material, or window. This provides greater overall transparency—i.e., allows more light through the window—compared to other shapes (e.g., rectangular cross-section) or types (e.g., transparent conductive oxides) of conductors given the same level of conductivity. Moreover, replacing transparent conductive oxides such as indium tin oxide with ETCs can increase the transparency by 2-6%. The material cost of the conductive material can be reduced by a factor of 100-300. ETC windows in accordance with various embodiments of the invention can maintain more than 99% of the effective transparency of an identical window without triangular metal lines through redirection of light. Such windows can provide a sheet resistivity of less than 5Ω sq$^{-1}$. FIG. 1 conceptually illustrates the operation of an ETC window in accordance with an embodiment of the invention. As shown, a viewer 100 can view an object 101 on the opposite side of an ETC window 102 despite the existence of metal lines since the metal lines 103 in the ETC window 102 are designed as ETCs and are capable of redirecting the light.

ETC windows can include ETCs that vary in shape, size, and material. The size, spacing, composition, orientation, and aspect ratio of the ETC lines can be varied to obtain the desired conductivity, transparency, and/or emissivity of the window material. The ETC lines can be fabricated from various types of metals to provide the desired conductivity, transparency, material compatibility, and cost. The metal lines can be made of various materials, including but not limited to silver and silver-clad copper. Silver can be a favorable material for the reflective surface(s) owing to its high reflectivity. In many embodiments, copper is utilized for the inner regions (or "core") of the conductors due to its high conductivity, low cost, and established use as a conductor in electrical and electronics applications. Various forms of materials can also be used to fabricate the ETCs. In many embodiments, metallic nanoparticle ink, such as but not limited to silver nanoparticle ink and copper nanoparticle ink, is used to fabricate the ETCs. In some embodiments, transparent dielectrics (e.g., glass, ceramics, polymers, etc.) are incorporated to support, strengthen, overcoat, or encapsulate the ETCs.

Figure 2:
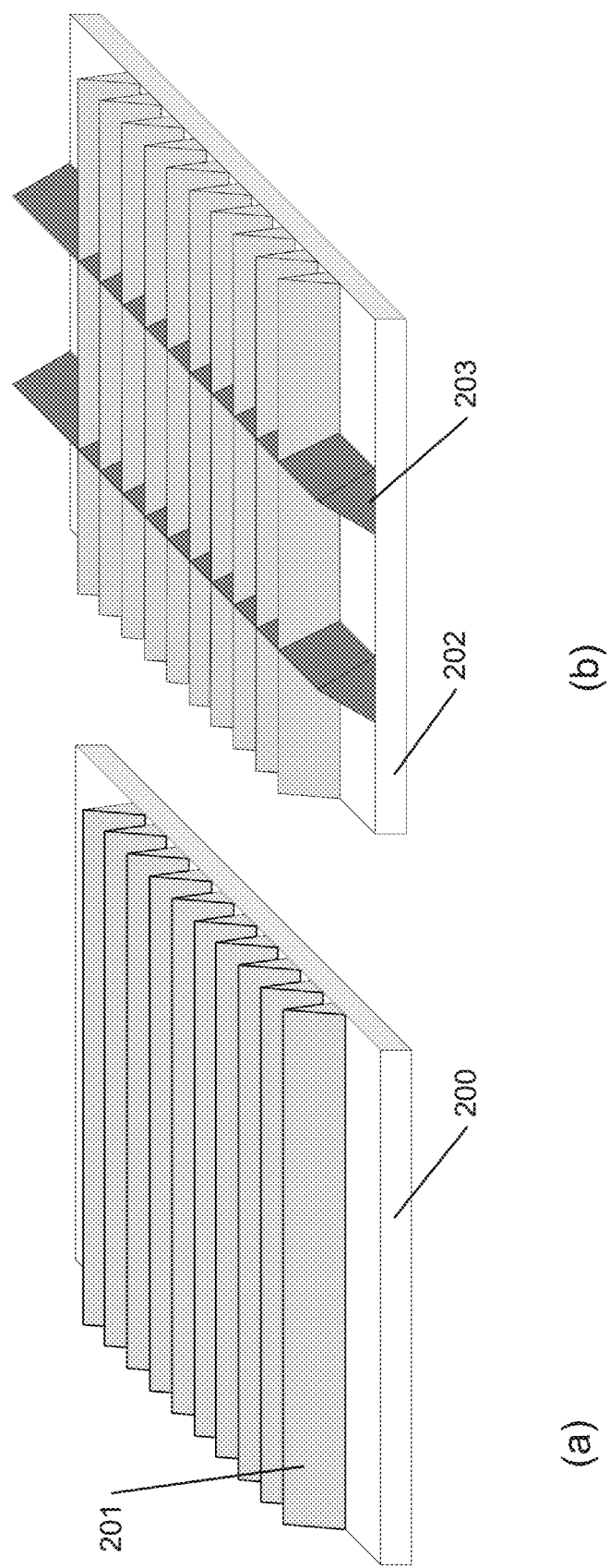
FIG. 2 conceptually illustrates two different ETC configurations in accordance with various embodiments of the invention.
Figure 3:
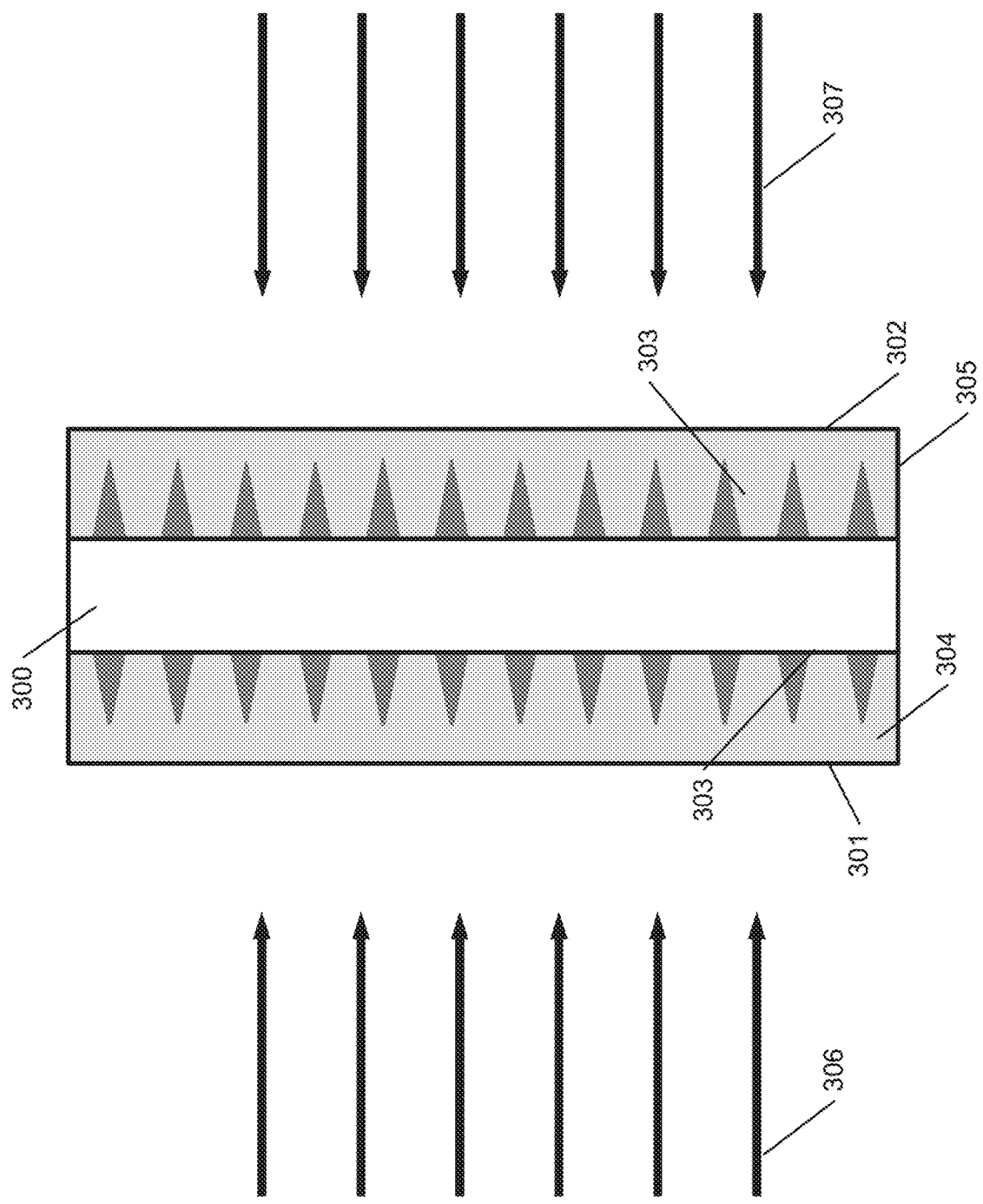
FIG. 3 conceptually illustrates a thin film solar module having front and rear contacts incorporating effectively transparent contacts in accordance with an embodiment of the invention.

ETCs implemented in transparent applications can be configured in many different ways. For example, ETCs can be placed horizontally, vertically, or any combination of the two. For conductivity in one direction only (e.g., horizontal or vertical), parallel ETC lines can be used. For full planar conductivity, a grid or other pattern of intersecting ETC lines can be used. FIG. 2 conceptually illustrates two different ETC configurations in accordance with various embodiments of the invention. In the illustrative embodiments, FIG. 2(a) shows a window 200 with ETCs 201 in a horizontal orientation, and FIG. 2(b) shows a window 202 with ETCs 203 placed in both horizontal and vertical orientations. As can readily be appreciated, the specific configuration implemented can depend on the specific requirements of the given application. In many embodiments, the ETCs are implemented for applications in building integrated PV (BIPV). In such applications, the metal conductors can function as contact gridlines on or within the solar cells and/or as interconnect bus lines between cells or between windows. The windows can increase the efficiency of BIPV due to increased charge transport layer transparency and conductivity. In some embodiments, the windows are conductive substrates replacing transparent conductive oxide substrates and thin metal wire substrates for thin-film PV, such as but not limited to CdTe, CIGS, perovskite, and organic solar cells. The window can replace the front and/or rear contact of a BIPV solar module. For multilayer applications, such as but not limited to bifacial solar cells, the rear contacts can be fabricated as oppositely-oriented triangular contacts, which make the contacts effectively transparent for light incident from the rear (e.g., to ambient light from inside the room). As can readily be appreciated, this configuration can be expanded for non-PV applications. FIG. 3 conceptually illustrates an ETC window having front and rear oppositely-oriented ETCs in accordance with an embodiment of the invention. In the illustrative embodiment, the device includes a transparent layer of material 300 having a front ETC module 301 and a rear ETC module 302, each having a plurality of ETCs 303 embedded within an encapsulant layer 304, 305. As shown, the ETCs 303 are oppositely-oriented such that the ETCs 303 appear effective transparent to incident light 306,307 from either side. The transparent layer of material 300 can be a variety of different transparent substrates. In many embodiments, the transparent layer 300 is a single-paned window. In some embodiments, the transparent layer 300 includes PV materials for implementing a solar window. In a number of embodiments, the rear contacts are non-triangular cross-section contacts that are disposed in the shadow of the front contacts by aligning the front and rear contacts. In some embodiments, the ETC windows include polymers, such as but not limited to polysiloxanes and polyurethanes, that can be used as encapsulation and protection.

ETC windows in accordance with various embodiments of the invention can provide various functions. In many embodiments, ETC windows are implemented as photovoltaic, or solar, windows that can produce electricity. Such windows can convert a portion of incident light into current while allowing the remaining portions to pass through, which allows for the window to also function as a conventional window—i.e., allowing viewers to see through the window. ETC windows can also be used in electrochromic applications—e.g., windows that change transparency or become opaque upon application of voltage or current to ETC electrodes. In such embodiments, the window can incorporate triangular cross section metal lines to conduct current in one or more directions within the plane of the window. In some embodiments, ETC windows are implemented for defrosting and/or defogging applications via resistive heating. Such applications can be desirable in vehicles. In a number of embodiments, ETC windows are implemented for anti-soiling properties. In several embodiments, ETC windows are designed and implemented for thermal management in various applications. The thermal emissivity of glass windows can be greatly reduced by applying ETCs, enabling thermal insulation and heat management of buildings. For example, the ETC windows can be designed for the thermal management of buildings. In such applications, the wavelength response of the ETC window can be tuned for optimal spectral performance in the visible and a different, but also optimal, spectral response in the infrared. As can readily be appreciated, the wavelength response can be tuned for different spectral ranges, the specific range of which can depend on the specific requirements of the given application. In addition to the applications discussed above and throughout this disclosure, ETCs can be implemented for a combination of different purposes. For example, ETCs can be implemented to provide a window tint along with any of the applications described above, such as but not limited to solar windows, defrosting, and defogging applications. In several embodiments, the ETCs are implemented in a solar window while simultaneously providing a window tint, which can include augmenting the window appearance with a desired color tint. By using different metals and/or different coatings the window appearance can be tuned to a desired color. Under normal viewing angles, the ETCs can make scenes appear darker, depending on the coverage of the ETCs. This coverage can be configured to provide a desired shade of dark tint to the window. In some embodiments, the ETCs provide more than 25% of coverage. In further embodiments, the ETCs provide more than 50% of coverage. As can readily be appreciated, the amount of coverage can vary and depends on the specific requirements of the given application, such as desired performance and/or degree of tinting.

Figure 4:
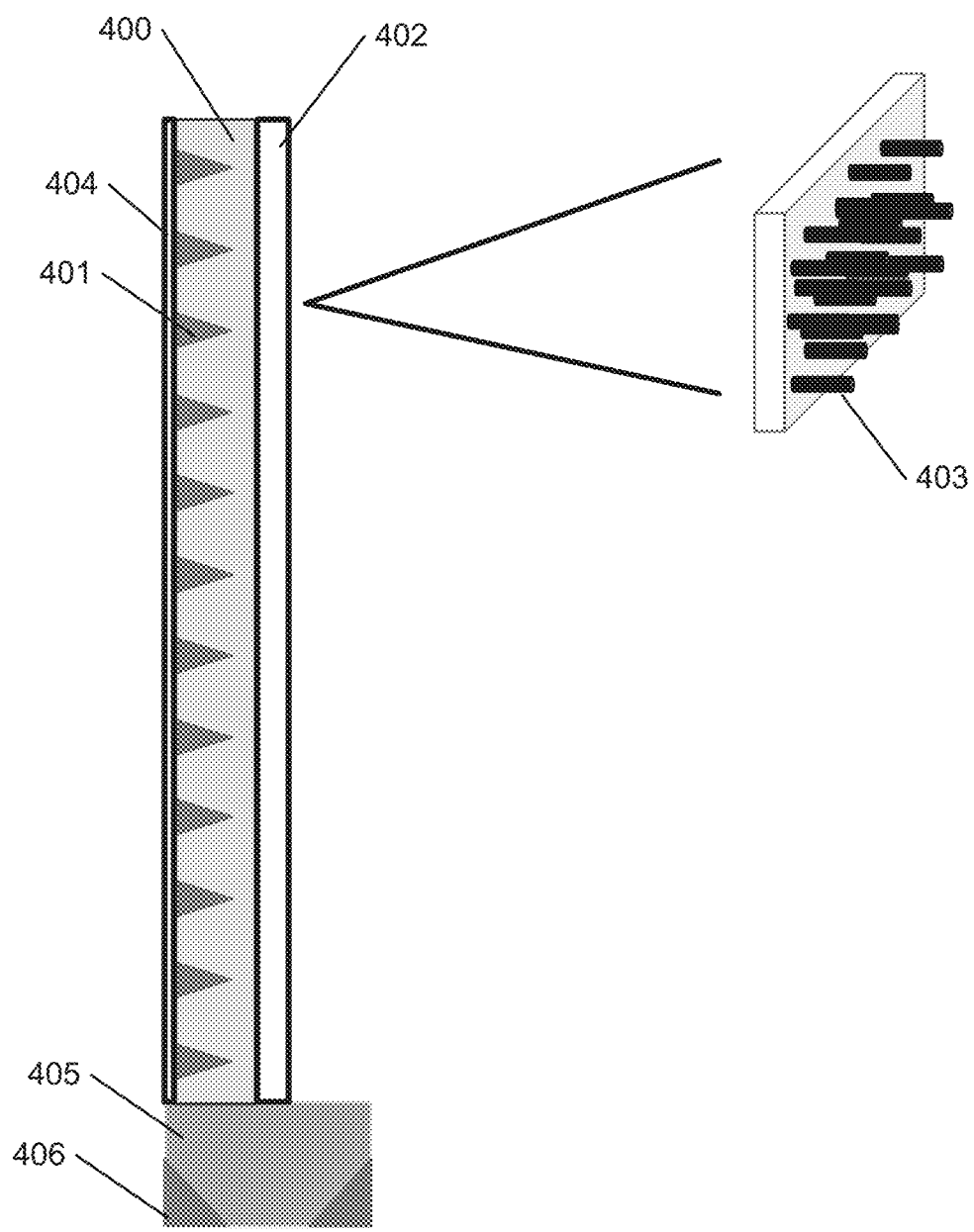
FIG. 4 conceptually illustrates an ETC window incorporating nanostructures in accordance with an embodiment of the invention.

ETCs inherently provide low emissivity properties. To obtain low emissivity of the whole window, areas in between can be coated with materials enabling low emissivity. Such coatings can be applied but not limited to front, rear, in between, underneath and on top of ETCs. Self-cleaning windows can be achieved either by adding nanostructures in between the ETC lines or by applying a voltage to the ETCs in order to repel water and dust. In many embodiments, one side of the polymer sheet is embedded with ETCs, while the other side (facing the environment) is partnered with nanocones that provide a super-hydrophobic surface that repel water and dust. Thereby, both products can be integrated into one new sheet/foil that can be applied to the window. In some embodiments, the polymer sheet is affixed to a glass/window and the nanostructures are formed on the glass side facing the environment. FIG. 4 conceptually illustrates an ETC window incorporating nanostructures in accordance with an embodiment of the invention. As shown, a polymer sheet 400 with ETCs 401 is affixed to a glass window 402 having nanostructures 403 formed on the side facing the environment. In the case of car windows, this can lead to a reduction of the aerodynamic drag. In the illustrative embodiment, the ETC window is a single-paned window. As such, the polymer sheet 400 includes a cover layer 404 for preventing the ETCs from having contact with the environment. Various types of cover layers, such as but not limited to TCO layers, glass cover layers, and various other transparent materials, can be used further includes a spacer 405 and sealing components 406. Although FIG. 4 illustrates an ETC window implementation with a glass window, any other transparent materials can be used. As can readily be appreciated, various techniques can be implemented to provide a hydrophobic surface. For example, various other nanostructures or coatings may be used. Another technique for repelling water and dust includes the application of a sine voltage wave to the ETC lines (different lines have different polarization) that can guide water and dust in one direction. The geometry of the ETC can determine the electric field, and benefits arise from the triangular shape of the ETCs as the electrostatic field distribution can be tuned by adjusting the aspect ratio to lie along the outer surface of the sheet. For this approach, to dissipate as little energy as possible, the ETCs can be embedded in non-conductive matrix, shielded from ionic liquids such as but not limited to salt water.

ETC windows can be designed as radio- or microwave-frequency shields for electromagnetic radiation by orienting the ETC lines with sub-wavelength pitch for the intended frequency range. For example, ETC windows could be used in high-power or high-sensitivity microwave/RF laboratories to block incoming or outgoing EMI without covering up the windows with opaque shielding materials. ETC windows can also be used on the doors of microwave ovens to provide a less obstructed view of the food compared to typical perforated metal shielding. In many embodiments, ETC windows are designed to act as microwave or RF antennas by incorporating the ETCs in particular shapes and patterns that enable efficient operation as antennas. For example, reception antennas for TV, radio, satellite, cellular, or internet service providers can be integrated into exterior building windows without blocking light transmission through the windows. Window-mounted antennas typically offer better reception than interior-mounted antennas. In some embodiments, large-area ETC window antennas are implemented to enable building-integrated Wi-Fi hotspots with better indoor/outdoor service coverage through improved path and diversity.

ETCs can transmit almost all of the incident light, which leads to a relative solar cell efficiency enhancement of ~4-10% (depending on the front contact grid that is replaced). The reason for this high transmission is the redirection of light to the active area of the solar cell. The redirected light can enter the solar cell under an altered angle and, in a solar window, a portion of this light is transmitted. Although the ETCs implemented in ETC windows operate as "effectively transparent," there can exist optical distortion of rays passing through the window due to the nature of how the ETCs operate. The visual appearance of rays passing through an ETC window can strongly depend on the geometric properties of ETCs (i.e., aspect ratio and periodicity) as well as on the viewing angle. From a view perpendicular to the plane of the ETC window (i.e., orthogonal to the horizontal/vertical ETC lines), ETC windows can appear marginally darker than normal windows. Observation of scenes through ETC windows under an angle perpendicular to the ETCs can lead to the appearance of "ghost images"—scenes projected through redirection of rays by ETCs—that can be tuned by adjusting the geometry. In many applications, these effects can be desirable. For example, privacy applications can be achieved by configuring the geometry of the ETCs to produce desired viewing conditions at certain angles while preventing the viewing at other angles. In order to understand how these distortion processes affect the visual appearance of windows with ETCs, an optical model that takes the properties of the human eye into account can be formed. Computational modeling and simulations that describes the visual appearance of ETC windows under different viewing conditions and with different geometries are discussed below in further detail.

Computation Modeling

Figure 5:
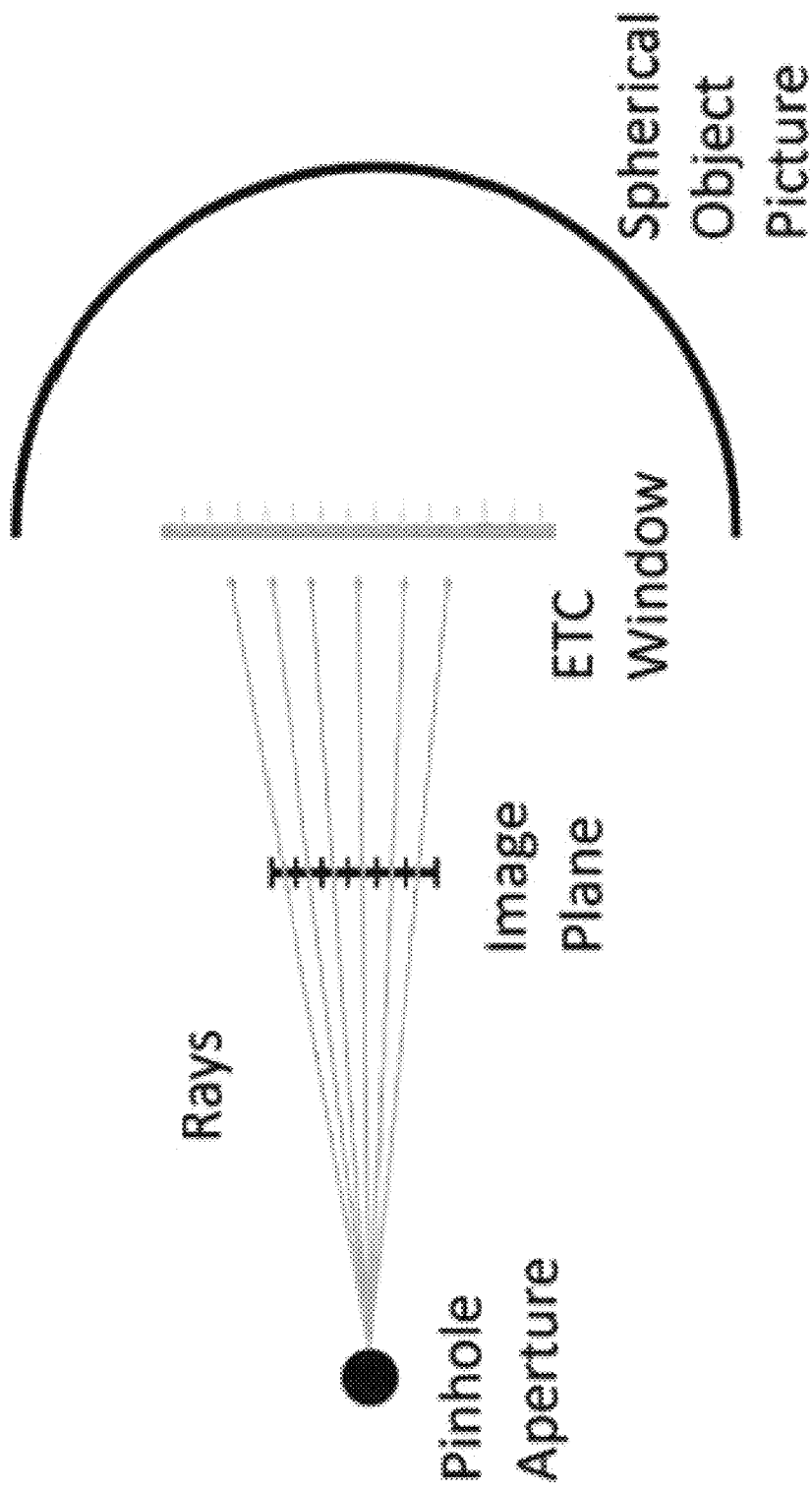
FIG. 5 conceptually illustrates a schematic of the ray optical model in accordance with an embodiment of the invention.

Computational simulations can be performed in order to obtain an accurate description of how a human eye perceives scenes observed through ETC windows. FIG. 5 conceptually illustrates a schematic of the ray optical model in accordance with an embodiment of the invention. The model described uses a ray optical approach adjusted to the human's eye resolution and depth perception as detailed below. The ray optical model is a standard emulation of a pinhole camera, optimized by tracing rays in reverse. Physically, in a pinhole camera, rays are incident through a small opening in an otherwise lightproof box, projecting an image on its back wall. This image is a point reflection of the original scene. As the ray trajectories are symmetric about the pinhole, the point reflection can be avoided by instead thinking of rays passing through an image plane outside the box. If only the rays that pass through the pinhole aperture were projected onto this image plane, an image identical to that on the back wall of the box can be obtained, only inverted. Thus, since only the rays that pass through the pinhole are of interest, rays that start there and span a grid on the image plane can be generated, with grid-points corresponding to pixels of an image. The pixel values can be obtained by finding intersections between rays and other objects in the environment. This method creates an image identical to the one with rays generated from the environment and moving towards the pinhole, but with the advantage of disregarding rays which do not pass through the aperture.

For further optimization, the only objects which were physically modeled were the window and the ETCs. The window can be treated as two refractive planes, and the ETCs were modeled as triangular prisms with reflective surfaces. 360° images can be used to approximate the outside environment. To simulate the experiment, the image used was an almost entirely dark sphere with a picture of a tree placed on a small patch in the direction of ray propagation. To simulate an observer looking through the window from a dark room, a 360° scene of a beach was used (photo by Peter Van den Wyngaert—www.littleplanet.be), with the back hemisphere blacked out, which corresponds to a dark room without illumination or reflective surfaces. In the simulation, the window was rotated about an axis that ran parallel to the ETCs to investigate the role of viewing angle in the visual appearance.

In order to accurately capture how the presence of ETCs affects the image, the ray density can be set high enough so that adjacent rays would not pass over an ETC. With windows at a distance of 25 cm and ETCs with a width of 5 μm, this equates to an angular spacing of 0.00002 radians between rays. This ray density produces a much higher resolution image than the human eye, which has an approximate angular resolution of 0.0003 radians. To lower the resolution to that of the eye, a bi-cubic interpolation wherein the output pixel value is a weighted average of pixels in the nearest 4-by-4 neighborhood can be used.

While the pinhole model's infinitely small aperture allows for a more efficient program, it creates an artificially clear image when compared to one generated by the eye. Because the eye is a finite aperture-lens system, it must focus at a particular depth, blurring objects which are closer or further than the given focal plane. This occurs because rays emanating from a point source not in the focal plane are not focused to a point on the image plane—rather, they are projected to a region. This region is called the circle of confusion and its diameter can be calculated geometrically.

To capture this effect while still using the pinhole model, a synthetic depth of field algorithm can be used. For example, the "Forward-Mapped Z-Buffer" method can be used, wherein pixels are sorted into different planes based on the depth at which their respective rays intersect objects. Pixels in planes that are not in focus are blurred into a new image as circles whose diameter equals the circle of confusion and whose alpha values, which dictate transparency, are inversely proportional to the circle's area. For this experiment, the circle of confusion was calculated to be 110 µm, while the width of the image is 400 µm.

Figure 6:
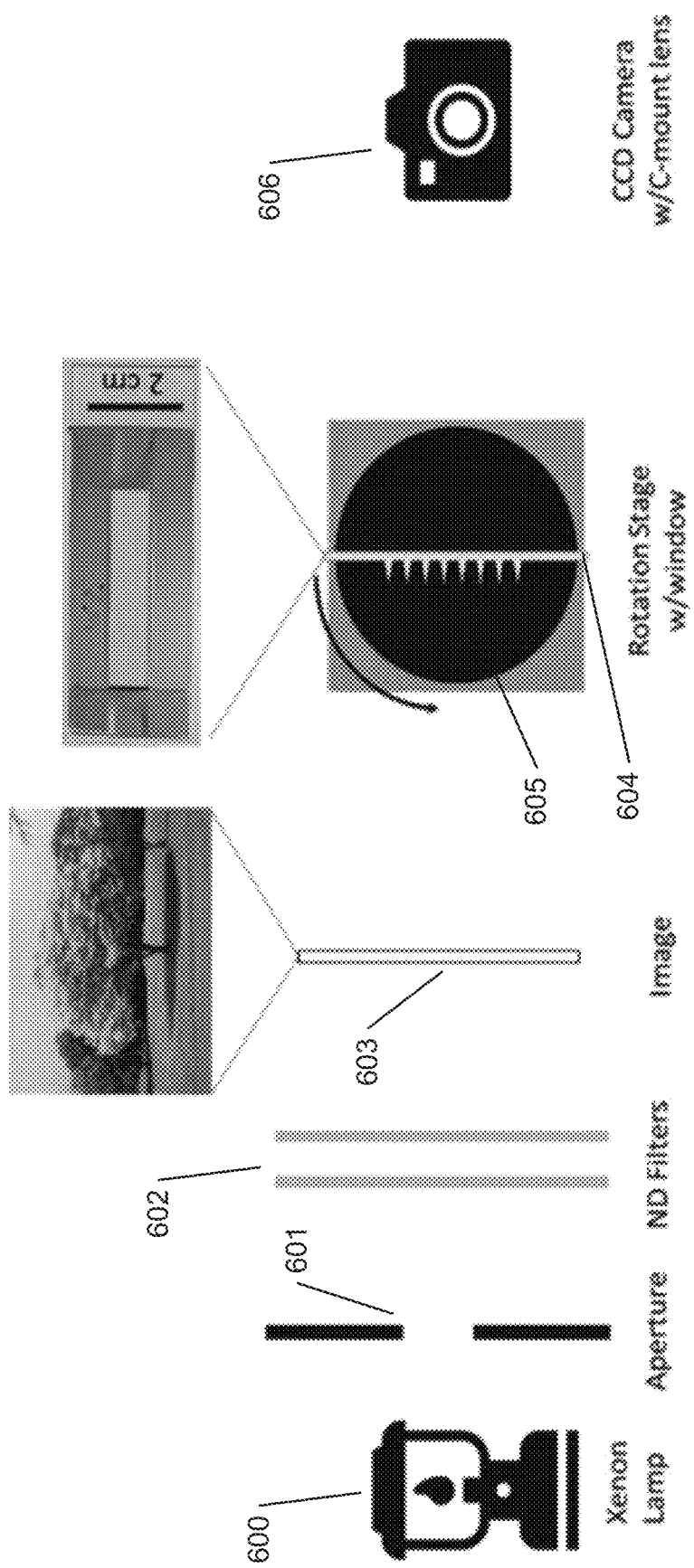
FIG. 6 shows a schematic of an experimental setup in accordance with an embodiment of the invention.

In order to verify the computational model, experimental results were compared with the results obtained from the model. FIG. 6 shows a schematic of an experimental setup in accordance with an embodiment of the invention. As shown, a xenon lamp 600 was used as white light illumination source and the light intensity was reduced by introducing a 2 cm diameter aperture 601 and neutral density (ND) filters 602 in the beam path. The image of a tree 603 was printed on a transparency slide and placed behind the ND filters. A window 604 coated with ETCs was mounted on a rotation stage 605 with the ETC tips pointing towards the light source. The window area was 0.8 cm×3 cm, and ETC lines were parallel to the short side and along the rotation axis. This geometry of the window allows for rotation with only minor limitations due to edges. For reference, the experiment was also performed with a window without ETCs. Images were taken with a CCD camera 606.

Figure 7:
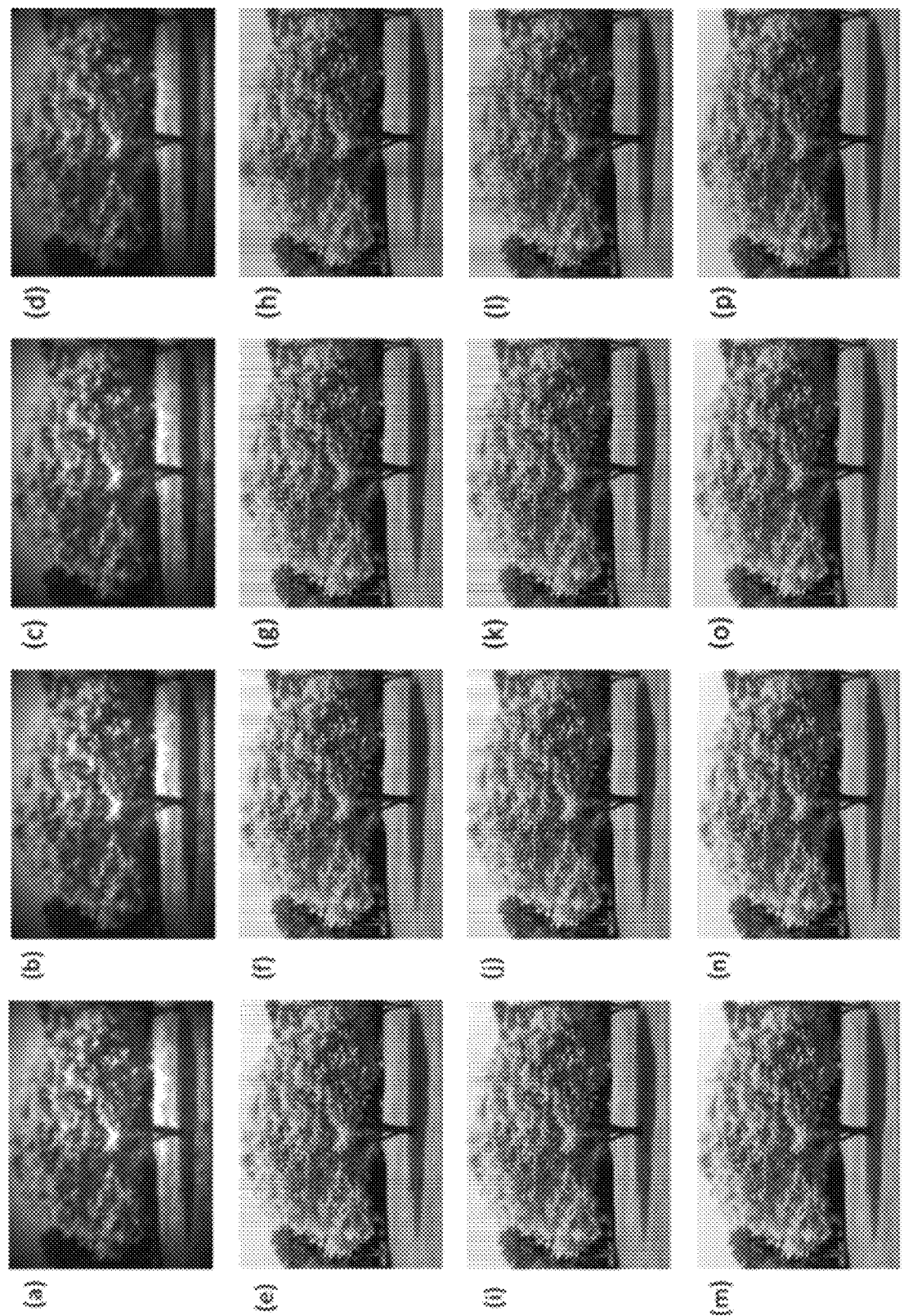
FIG. 7 shows a series of images seen through ETC windows in accordance with an embodiment of the invention.

The window was rotated up to 60° relative to the normal position shown in FIG. 6, which is define as 0°, and images were captured at every 10° step. To account for fluctuations in the light intensity, every configuration was measured five times and an average was created after performing a drift correction. FIG. 7 shows the measured images under (a) 0°, (b) 20°, (c) 40°, and (d) 60°. It can be seen that the image becomes darker when the ETC window is rotated. Using the same geometry as in the experiment, a computational study can also be performed. FIGS. 7(e)-7(h) show the result of a high resolution ray tracing computation. It can be seen that black lines appear, caused by the ETCs. If the resolution is lowered to reflect the camera's resolution, the results in FIGS. 7(i)-7(k) are obtained. As shown, the black lines are still pronounced and the overall appearance is different than those of the experiment. For the images in FIGS. 7(m)-7(p), depth of field correction was performed according to the process described above. The pronounced black lines disappear, and the images seem to only become darker when the window is rotated.

For a more quantitative comparison, the structural similarity (SSIM) index can be used. This algorithm estimates the subjective similarity between two images by mimicking the functionality of the human visual system. The three criteria that it uses to judge similarity are luminance, contrast, and structure. Luminance refers to the comparison of overall brightness between the two images, and its calculation involves using the mean values from a small area of pixels. Contrast is the difference in the local range of brightness between two images, and its calculation involves using the normalized standard deviation between pixels. The final criterion is meant to represent the difference in local structure between the two images, and its calculation involves taking the inner product of local pixels in one image with local pixels in the other. The first two components range from zero to one, and the last ranges from negative one to one; these are combined to form the total structural similarity index, which ranges from negative one to one.

To use this algorithm in the comparison of ETC-coated windows at various angles, a reference image was chosen for each set of images. The reference image was an uncoated window that was generated under the same conditions as the rest of the images in the set. This was taken to be the ideal image for each set—an SSIM value lower than one would indicate a deviation from the ideal and, therefore, a degradation. Values for luminance, contrast, structure, and total SSIM for images generated in various ways are plotted in FIG. 8.

Figure 9:
FIG. 9 shows a picture of the sun and the institute building at the University of Twente taken through an ETC window with vertical ETC lines in accordance with an embodiment of the invention.

The presented comparison shows that the ray optical model accurately describes the experiments for the propagation of incoherent, diffused light. It is demonstrated previously that no resonant absorption or (Mie) scattering is present when visible light interacts with triangular silver structures with width >2.5 µm, and that the total transmission intensity can be described with a ray optical formalism. However, close attention needs to be paid to the spatial transmission profile in order to determine the visual appearance. Knowledge on the spatial coherence of the light involved is required to accurately determine the electric field propagation profile behind the window. The ETC windows include periodic structures that could potentially cause Fraunhofer diffraction in the far field—at the location of the observer. For point light sources such as light emitting diodes, lasers, and any light source observed through an aperture, diffraction patterns are observed. The spatial coherence of direct sun light is 80λ, where λ is the wavelength of the concerned photons. The periodicity of the ETC grid used is 80 µm and, thereby, close to this regime. When looking through ETC windows directly at the sun, diffraction becomes visible. FIG. 9 shows a picture of the sun and the institute building at the University of Twente taken through an ETC window with vertical ETC lines in accordance with an embodiment of the invention. As shown, a rainbow diffraction pattern appears in the horizontal direction and perpendicular to the ETC lines. The appearance of the sky, clouds, a tree and the building are not disturbed by the ETC window. For scattered sun light—which constitutes the majority of the field of view—the assumption of low spatial coherence is valid and a ray optical approach is justified. In practical applications in which undistorted view is crucial, such as eye glasses and car windshields, only the zero order diffraction peak would be desired. Higher order diffraction peaks can potentially be suppressed by introducing aperiodic structures. With aperiodic ETC grid patterns, the pitch (distance between ETCs) can be designed to be irregular and not a fixed distance, which can suppress the higher order diffraction peaks and solve the issue caused by the spatial coherence of the sunlight.

Angle Dependent Visual Appearance of ETC Windows

Figure 10:
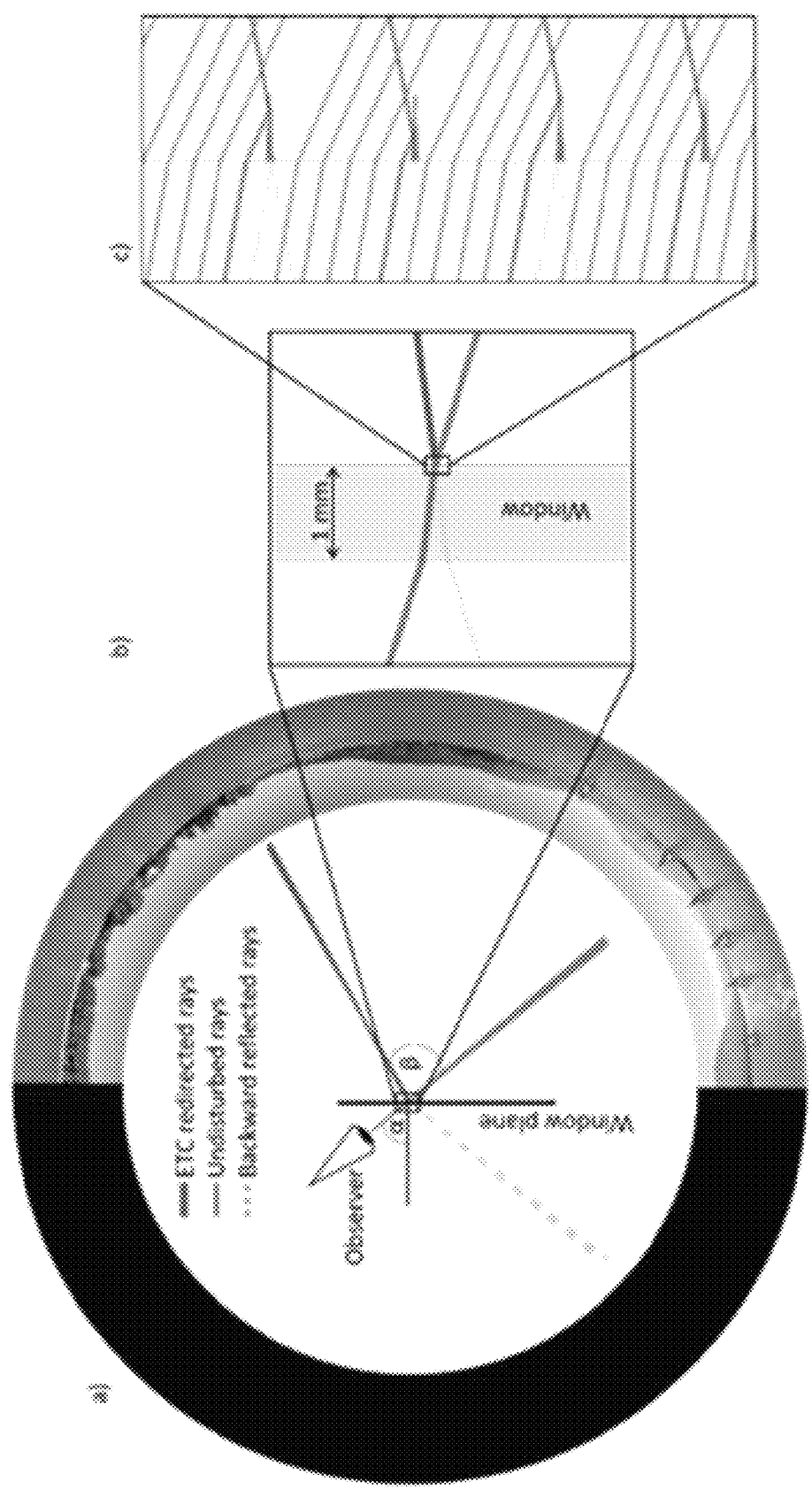
FIG. 10 shows a visualization of the optical model for scenes observed through an ETC window under an angle in accordance with an embodiment of the invention.

Using the above described model, the angle dependent visual appearance of ETC windows can be investigated. If scenes are observed under an angle, the possibility arises for rays redirected by ETCs to fall within the numerical aperture of the eye. FIG. 10 shows the rays involved in this process. FIG. 10(a) gives a high level overview of all components involved. The observer observes a scene from a dark room through an ETC window under an angle α perpendicular to the window plane. The undisturbed rays are shown in grey and result in an image of sailing boats in water. Rays that are hitting the bottom of the triangle are coming from the dark room and, therefore, darken the picture as described above. Rays that are redirected by the ETCs are shown in red. These rays project an image from a different scene and under a different angle than the undisturbed rays. In the following, this angle is referred to as the β-angle where an angle of 180° corresponds to the same scene projected by undisturbed rays. In FIG. 10(b), the area around the window is magnified such that the diffraction of rays at the window becomes apparent. In FIG. 10(c) the scene is further magnified to show the ETCs and their influence on the light redirection.

Figure 11:
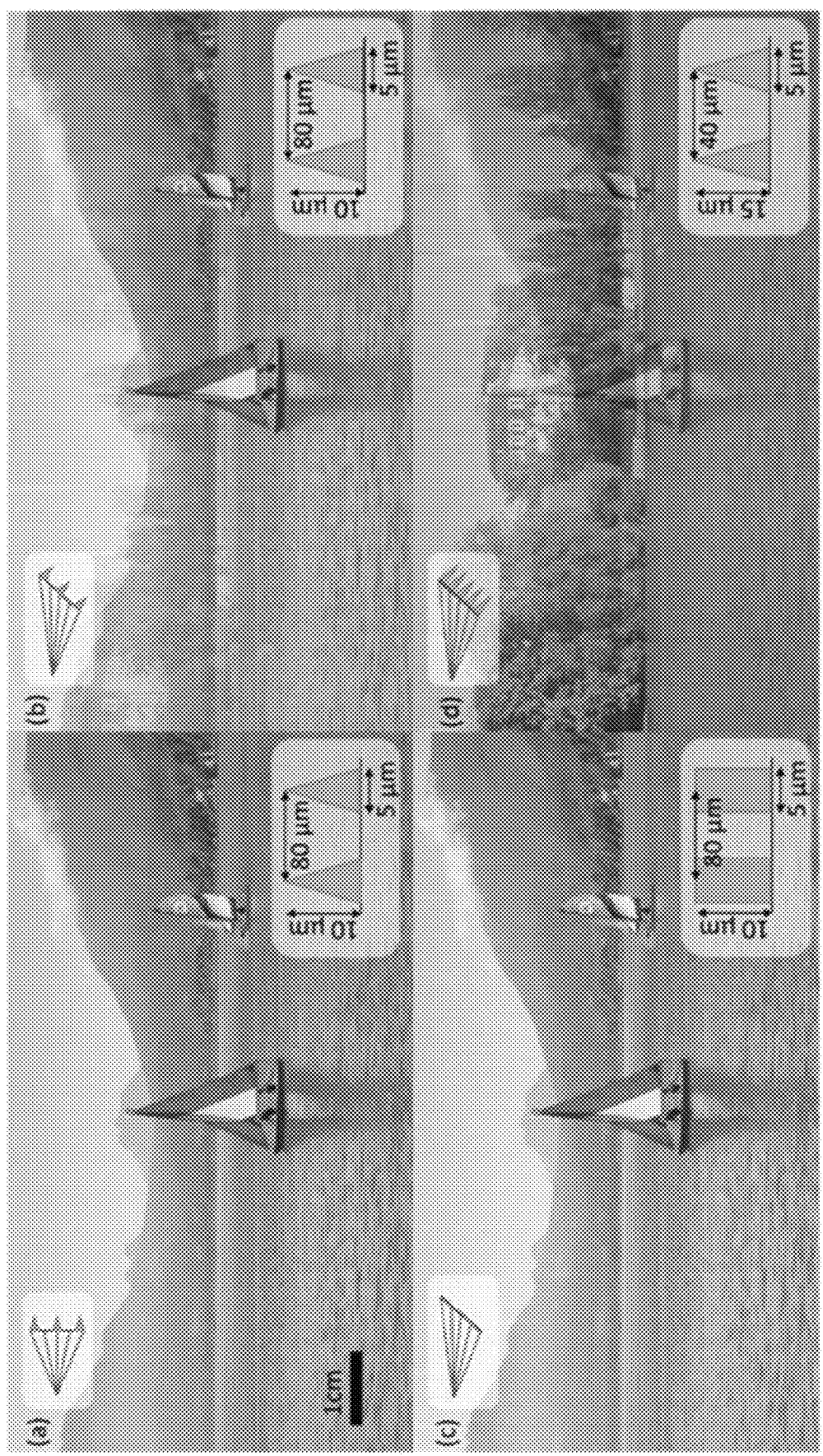
FIG. 11 shows a scene of sailing boats on a lake observed in four different ways in accordance with an embodiment of the invention.
Figure 12:
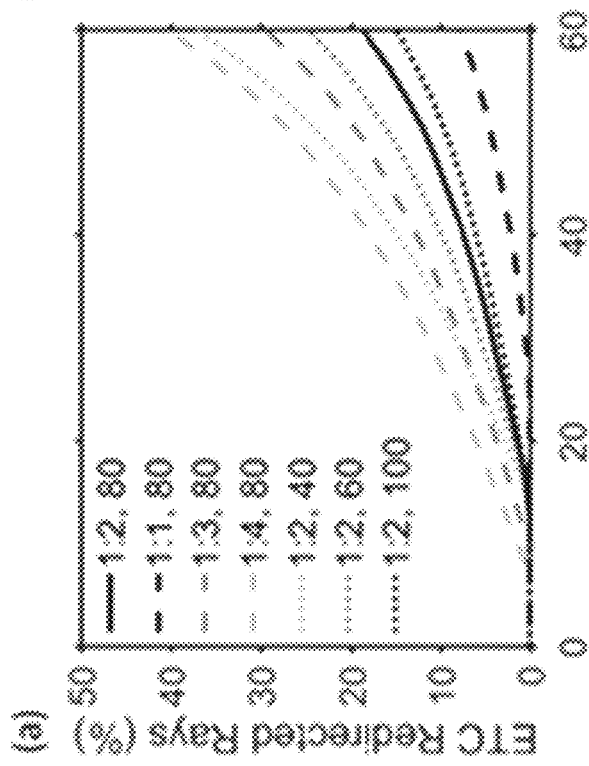
FIG. 12 shows the percentage of ETC redirected rays that create a ghost image and the β-angle of the ghost image in relation to the viewing angle of an ETC window in accordance with an embodiment of the invention.

FIG. 11 shows the same scene of sailing boats on a lake observed in four different ways. In FIG. 11(a), the scene is viewed through an ETC window under normal incidence. In FIG. 11(c), the scene is viewed under an angle of 50° to a window with flat contacts with 5 μm width and 80 μm periodicity. This image appears undisturbed. In FIGS. 11(b) and 11(d), scenes are observed through ETC windows with different periodicities (80 μm (c), 40 μm (d)) and different ETC heights (10 μm (c), 15 μm (d)). It can be seen that in both cases, a ghost image from a different scene appears. Due to the closer spacing in FIG. 11(d), the ghost image is more pronounced than in FIG. 11(b). Due to the higher aspect ratio in FIG. 11(d), the projected scene is further away from the undisturbed image than in FIG. 11(b). These relations are quantified in FIG. 12. In FIG. 12(a), the percentage of ETC redirected rays that create the ghost image is presented as a function of the viewing angle α. The relation is shown for different periodicities and different aspect ratios. The closer the spacing and the higher the aspect ratio, the higher the percentage of redirected rays. FIG. 12(b) shows the β-angle of the ghost image scene. At the onset of the ghost image the β-angle is at 180°, which corresponds to the undisturbed image. With increasing viewing angle α, the β-angle decreases, which means that the projected ghost scene moves further and further away from the undisturbed scene. The higher the aspect ratio, the earlier the onset and the difference compared to the undisturbed image. In conclusion, FIG. 12 shows that the appearance and strength of ghost images strongly depends on the geometry of the ETCs and becomes less pronounced for ETCs with scarce spacing and low aspect ratio. However, ETC patterns with high aspect ratio and dense spacing generally lead to higher conductivity. Furthermore, dense spacing also improves light trapping. Therefore, the design and manufacturing of ETC superstrates for use in solar windows requires careful consideration to find the optimal configuration that fulfills all electrical, optical, and appearance requirements. Ghost images and processes for mitigating ghost images are discussed below in further detail.

Ghost Images and Diffraction Patterns

Figure 8:
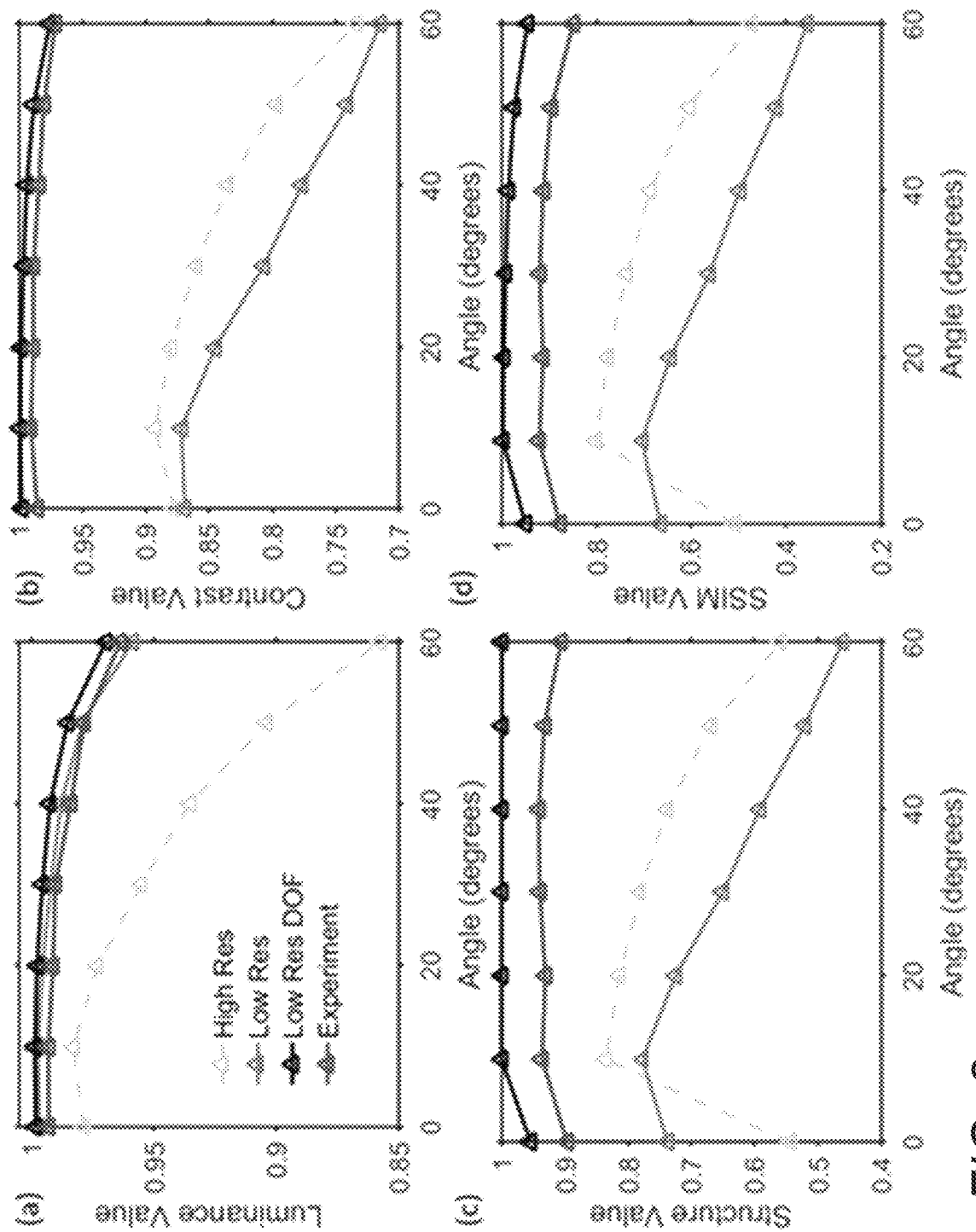
FIG. 8 shows a quantitative comparison between experimental results and computational simulations in accordance with an embodiment of the invention.

Under normal viewing angles, micro-lines let scenes appear darker, depending on the coverage. The individual lines, however, are invisible to the human eye. This holds for normal, flat micro-contacts as well as for ETCs. However, despite the same visual appearance, ETCs can transmit all, or almost all, light while flat contacts reflect a substantial portion. The redirected light rays of the ETCs do not fall within the numerical aperture (viewing cone) of the eye and therefore are not observed. The observed structure similarity index depending on viewing angle is shown in FIG. 8.

Normal incidence of spatially coherent light can lead to diffraction patterns, which occurs for ETCs and flat microcontacts. The occurrence of diffraction depends on the spacing of the ETCs and on the spatial coherence of the light. Densely spaced ETCs can block light incident perpendicular to the lines beyond the cut-off angle—i.e., restrict light off from perpendicular to enter. This depends on the pitch and aspect ratio/angle of the ETCs. The angle dependent transmission of light into a silicon heterojunction solar cell is shown for different ETC coverages. The higher the coverage, the earlier the cut-off angle.

Figure 13:
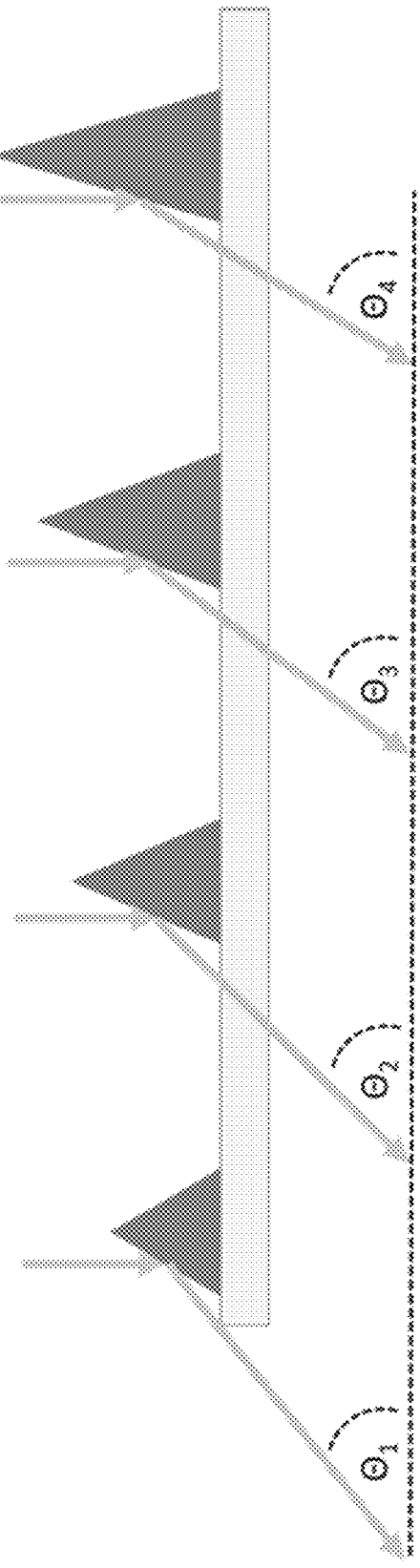
FIG. 13 conceptually illustrates an irregular ETC pattern in accordance with an embodiment of the invention.

As discussed above, ETCs can create ghost images if viewed under an angle. The strength and angle with respect to the original scene of this ghost image depends on the pitch and aspect ratio of the ETCs. Depending on the application, these ghost images might or might not be desirable. For example, ghost images may be desirable for privacy and beam-splitter applications by altering what is viewed at certain angles. In applications where such images are not desirable, the ghost images can be avoided using irregular ETCs—i.e., ETCs with different aspect ratio in order to obtain different sidewall angles. FIG. 13 conceptually illustrates an irregular ETC pattern in accordance with an embodiment of the invention. In the illustrative embodiment, only one unit cell of a periodic pattern is shown. In many embodiments, such a pattern would continue periodically with the same structures. As shown in FIG. 13, the redirected rays now have different angles $\Theta_2, \Theta_3, \Theta_4$) with respect to the window. Instead of one clear ghost image, several ghost images will be superimposed, which creates haziness instead of a clear image. Such implementations can be more desirable for various applications, including but not limited to privacy applications, compared to ghost images. The more different sidewall angles (or different aspect ratios), the less pronounced the ghost images—with the constraint that the pitch also influences the strength (as shown in FIG. 12). As can readily be appreciated, various irregular patterns can be implemented depending on the desired strength of the ghost images. In some embodiments, the irregular pattern includes a number of ETCs having different heights. In many embodiments, the ETC pattern is configured to have a number of different sidewall angles that produces a ghost image strength that is no longer visible to the human eye. In some embodiments, more than three different sidewall angles are implemented in the ETC pattern. In further embodiments, more than five different sidewall angles are implemented.

In addition to ghost images, diffraction can occur whenever a periodic pattern has a pitch of less than the spatial coherence of the light that interacts with it. For a building integrated window, the main goal would be to cancel out the diffraction of sunlight. Studies suggest that sunlight should have a coherence of around 80 times the wavelength. With an 80 um period, diffraction of sunlight and certainly also other point sources, such as LEDs and lasers, can still be observed (as shown in FIG. 9). Several solutions can be implemented to mitigate diffraction. One way to mitigate the diffraction is to implement less dense ETC patterns. Another solution includes the use of irregular pitches (different distances among pairs of ETC lines) that can cancel out higher order diffraction. The latter is only feasible to mitigate sunlight diffraction but would require too scarce spacing for LED light. Irregular pitches can include slight changes that introduce irregular phase changes. Such changes can be in the 50-100 nm order to obtain the desired effect. As can readily be appreciated, different irregular pitch patterns can be implemented depending on the specific requirements of the given application. In many embodiments, the minimum amount of changes to the pitch are introduced such that sunlight diffraction no longer occurs. In other embodiments, the slight changes are introduced to the pitch such that performance and diffraction are balanced to a desired level.

As discussed above, ghost images and cut-off angles can enable new functionalities. The cut-off angle mentioned above can enable windows that only accept light under a small acceptance cone. This can be favorable for vertical windows that block the steep sun in summers and during middays but accept the sunlight when the sun is under lower azimuthal angles, such as in winters, mornings, and evenings. This application can also be achieved without infilling the triangular shaped grooves (i.e., encapsulated air or void), since conductivity is not required for this particular functionality/application. Ghost images can enable additional functionalities for privacy as the strength of the original image becomes lower under steeper angles (see FIG. 12). Furthermore, ghost images can be used to facilitate surveillance, as two scenes are visible during the same time. In many embodiments, a window can be configured to widen the viewing angle by incorporating ETCs in designated areas (such as the sides of the window) and in specific configurations (such as having the ETC tips pointed towards the viewer). Fabrication processes for ETC windows are discussed below in further detail.

Fabrication Processes

Figure 14:
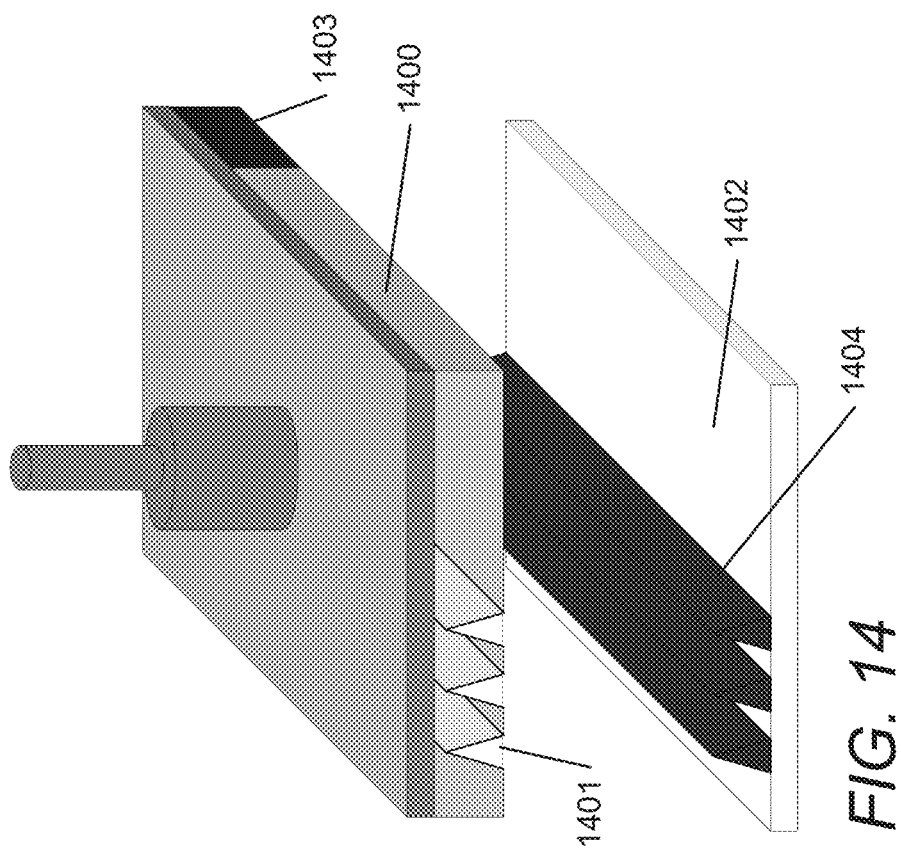
FIG. 14 conceptually illustrates a direct printing method in accordance with an embodiment of the invention.

The manufacturing of ETC windows in accordance with various embodiments includes many different processes and techniques. One method includes the use of a direct printing where the ETCs are directly printed on top of the glass. FIG. 14 conceptually illustrates a direct printing method in accordance with an embodiment of the invention. As shown, the process includes a printing head 1400 containing triangular grooves 1401. The printing head 1400 can be implemented as a mold that can be made of various materials, including but not limited to various types of polymers. In the illustrative embodiment, the printing head 1400 is a polydimethylsiloxane (PDMS) mold. The printing head 1400 can be modified such that a good seal between the glass substrate 1402 and the printing head 1400 is achieved, which helps provide residue-free printing. Once the printing head 1400 is in position, a reservoir 1403 of the desired ETC material introduces the printing material via a printing process that can include but is not limited to the use of capillary forces and/or positive/negative pressure. Once cured, the printed material forms ETCs 1404. In many embodiments, the ETCs 1404 are made from an ink containing metallic nanoparticles. In further embodiments, silver nanoparticle ink or copper nanoparticle ink is utilized. Such materials can be formulated to have properties, such as low viscosity, that can help facilitate the printing process. After directly printing the ETCs 1404 on the glass surface, free-standing (in air) ETCs 1404 are created directly on top of the glass/window 1402. Afterwards, these ETCs can either be encapsulated with a polymer, such as but not limited to ethylene tetrafluoroethylene (ETFE), ethylene chlorotrifluoroethylene (ECTFE), PDMS, EVA, polyurethane, and PMMA, or they can remain free standing in air, which is possible in the case of a double-pane window/glass where the ETCs are in between the double-pane glass and in direct contact with an inert gas such as but not limited to argon gas. In such embodiments, the double-pane window can be sealed to make sure the argon gas does not leak out and to prevent moisture from getting into the window. In the case of double-paned windows, the ETCs do not have to be encapsulated since they are protected by the seal and argon gas from contact with moisture, thereby preserving the ETC and preventing or reducing the corrosion of the ETC material.

Figure 15:
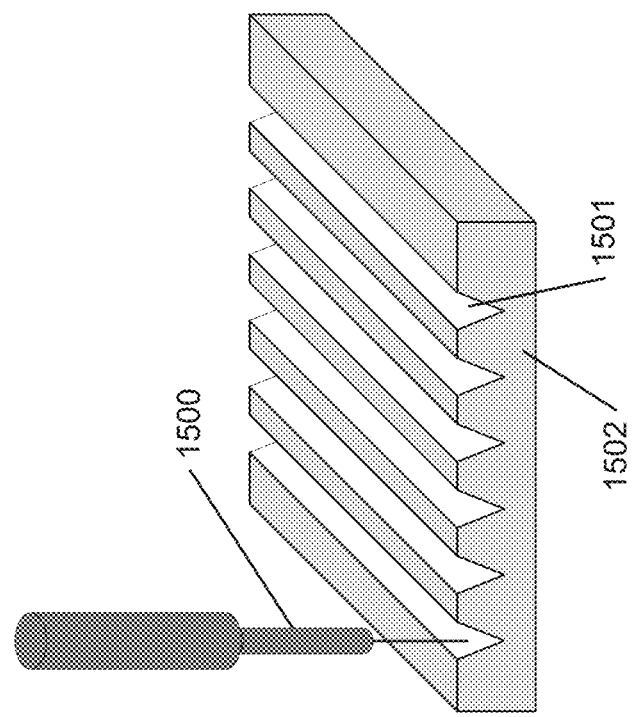
FIG. 15 conceptually illustrates a direct micromachining process in accordance with an embodiment of the invention.

A second fabrication process includes the use of direct micromachining. Such approaches includes micromachining V-grooves into the glass or polymer window substrate. The machining process can include the use of various techniques such as but not limited to direct laser machining, micromilling, and fly-cutting with a sharp diamond tool. Afterwards, the grooves can be infilled with a silver nanoparticle ink (or any other ETC material) via various possible approaches such as dip-coating, pressure-build system, and/or capillary flow. Additionally, selective surface treatment can also be used to facilitate the infilling process. FIG. 15 conceptually illustrates a direct micromachining process in accordance with an embodiment of the invention. As shown, the process includes a machining tool 1500 configured to form grooves 1501 on a surface of a glass layer 1502. Although FIG. 15 illustrates the machining of glass, various other materials can be used.

Figure 16:
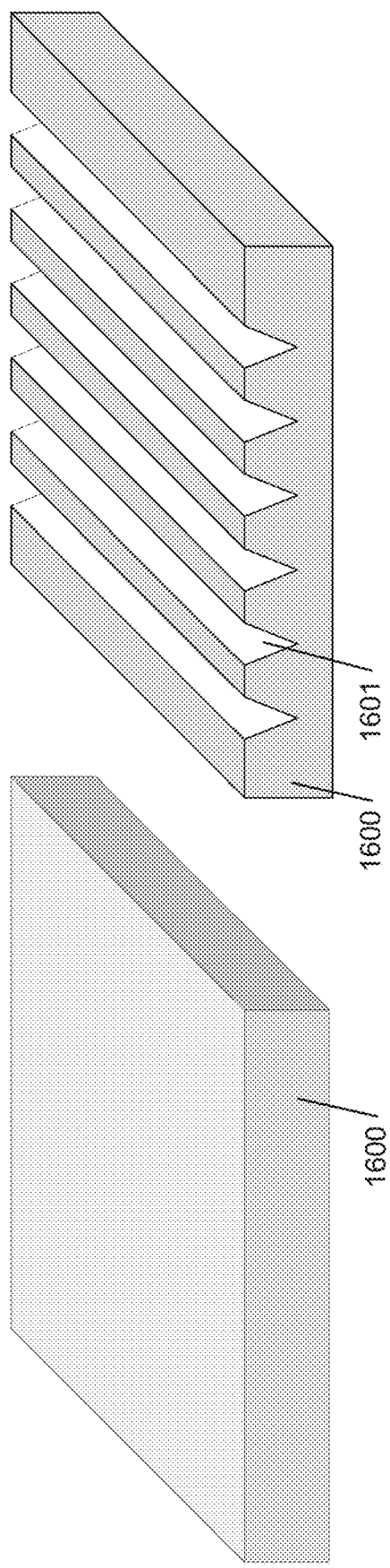
FIG. 16 conceptually illustrates a glass layer embossed with a plurality of grooves in accordance with an embodiment for the invention.
Figure 17:
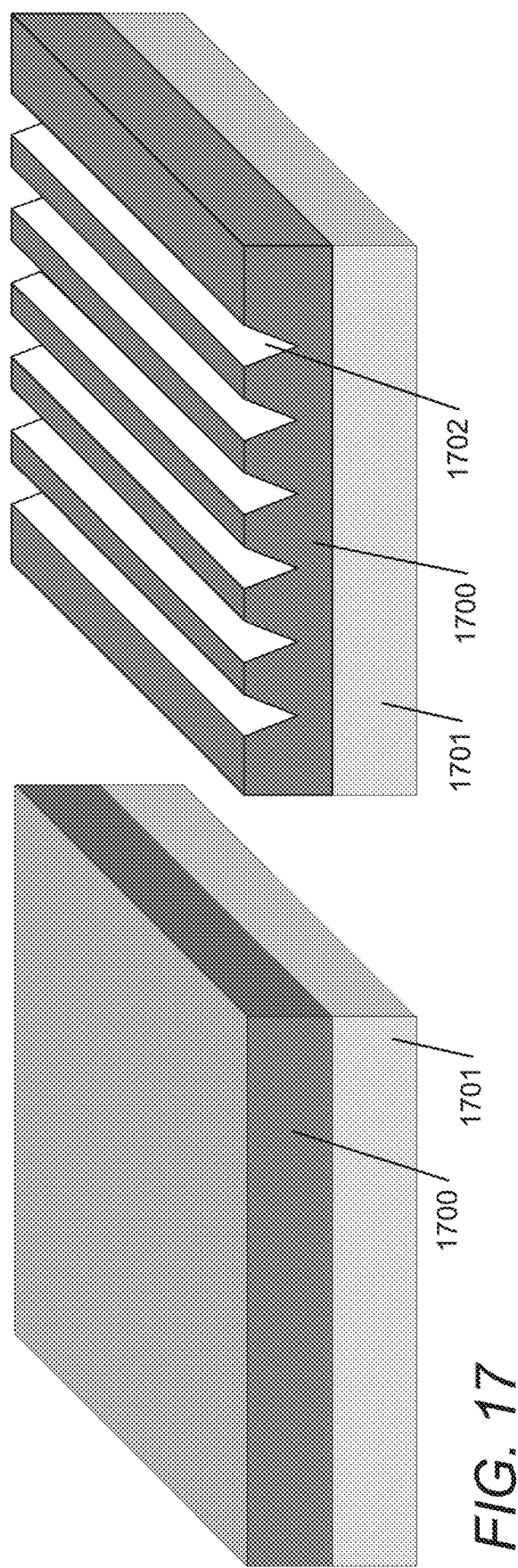
FIG. 17 conceptually illustrates an additional polymer/sol-gel layer with formed grooves added to a layer of glass in accordance with an embodiment for the invention.
Figure 18:
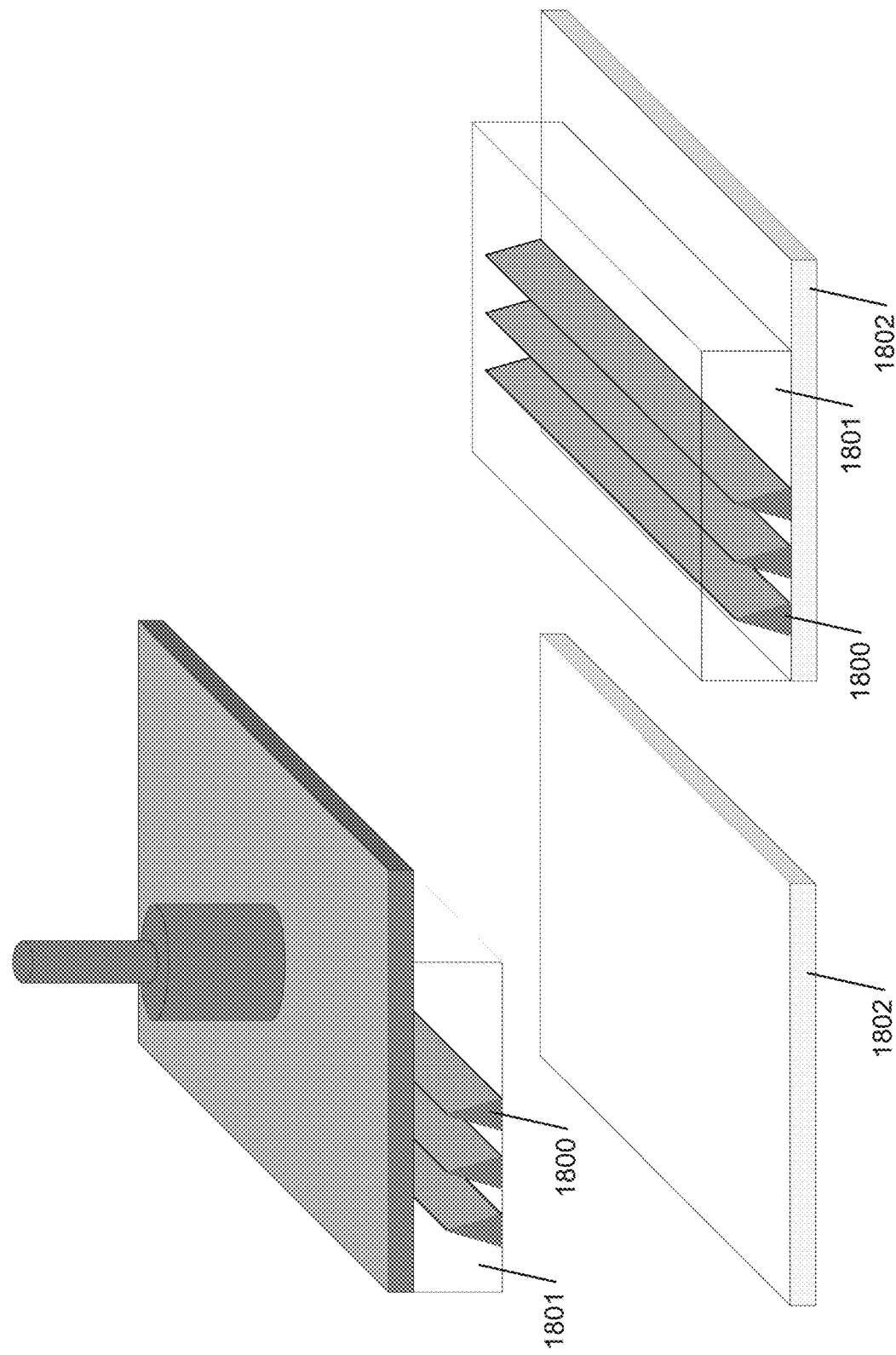
FIG. 18 conceptually illustrates incorporating an ETC superstrate containing ETCs embedded within a polymer layer on top of a glass layer in accordance with an embodiment of the invention.

One alternative to the micromachining process includes the use of an embossing/texturing process. In many embodiments, an embossing/texturing process is applied to a window. In such processes, the window/glass is typically heated above the glass transition temperature, and the glass is directly embossed to contain V-grooves. Afterwards, an infilling process, such as those described above, can be used. A similar approach includes the use of an additional polymer or sol-gel layer that is added to the window/glass and then embossed. FIG. 16 conceptually illustrates a glass layer 1600 embossed with a plurality of grooves 1601 in accordance with an embodiment for the invention. FIG. 17 conceptually illustrates an additional polymer/sol-gel layer 1700 with formed grooves 1701 added to a layer of glass 1702 in accordance with an embodiment for the invention. In the processes described above and throughout this disclosure, a substrate containing formed ETCs (termed an ETC superstrate) can be integrated with another layer for encapsulation. Integration of a transparent, conductive ETC superstrate sheet can include laminating the ETC superstrate on top of a window/glass. FIG. 18 conceptually illustrates incorporating an ETC superstrate containing ETCs 1800 embedded within a polymer layer 1801 on top of a glass layer 1802 in accordance with an embodiment of the invention.

Although FIG. 14-18 illustrate specific methods of forming ETCs, ETC superstrates, and ETC windows, any process can be utilized as appropriate depending on the specific requirements of the given application. For example, metallic ETCs can be formed in a variety of ways, which can include conventional microfabrication techniques known in the field. In many embodiments, electroplating is utilized to form ETCs having a core and an outer surface. In some embodiments, various metal coating techniques, such as but not limited to evaporated films, are used.

Figures 19, 20:
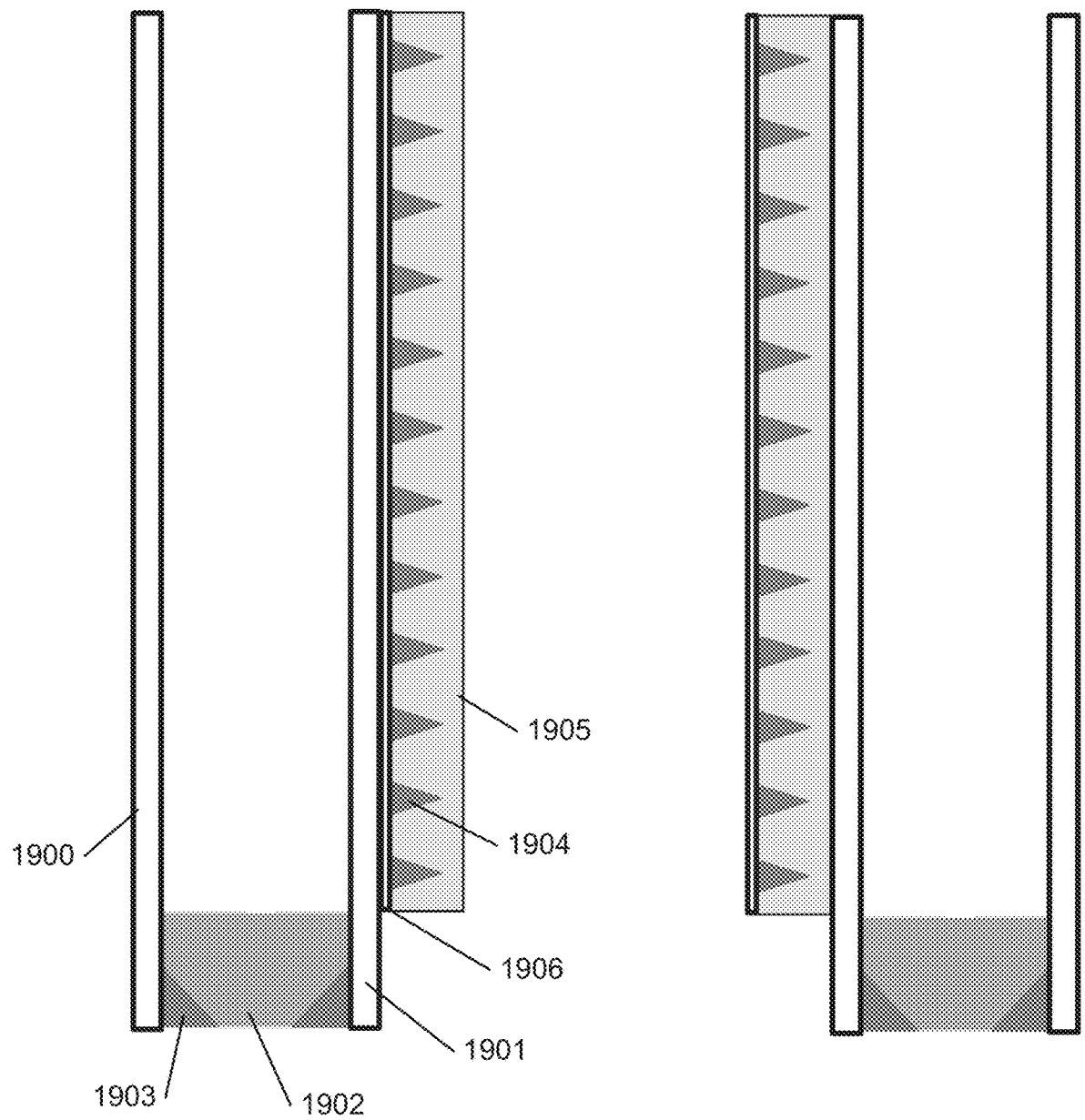
FIGS. 19-28 conceptually illustrate various configurations of ETC window implementations in accordance with various embodiments of the invention.

ETCs can be integrated in a window in a variety of configurations. In many embodiments, ETCs are integrated on the outer surfaces of the window. However, such configurations typically requires an encapsulation layer to reduce or prevent the degradation of the ETCs via corrosion through contact with moisture. As such, many embodiments include the use of an ETC superstrate. In such embodiments, the ETC superstrate can be laminated on the outside of the window. The ETCs superstrate sheet can function as a foil that can be added to existing windows. The ETC superstrate can be directly laminated on top of the glass via a conventional lamination process or with a gluing process. FIG. 19 conceptually illustrates an ETC superstrate incorporated on the outside of a double-paned window in accordance with an embodiment of the invention. As shown, the double-paned window includes two glass layers 1900, 1901 separated by a spacer 1902. The two glass layers 1900, 1901 forms an airtight cell (complete window not shown in FIG. 19) using seals 1903, which can include any conventional seals. In the illustrative embodiment, the ETC superstrate is affixed onto the outside surface of the glass layer 1901 (surface not facing the interior cell). As discussed above, ETC superstrates can be formed in many different ways. In the illustrative embodiment, the ETC superstrate includes ETCs 1904 embedded within a polymer sheet 1905. The ETC superstrate further includes a cover layer 1906, which can be a TCO layer or any other layer of transparent material.

Figure 21:
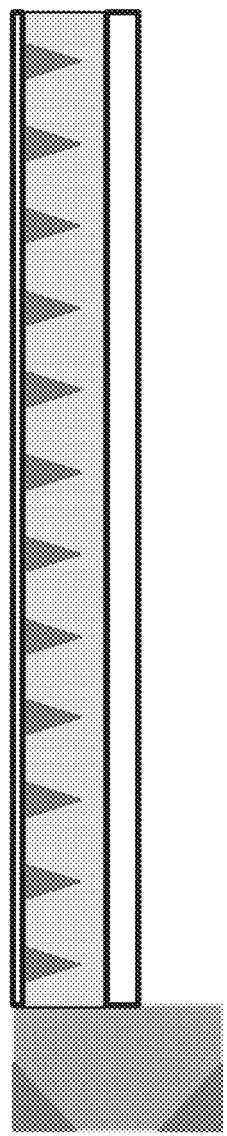
Figure 22:
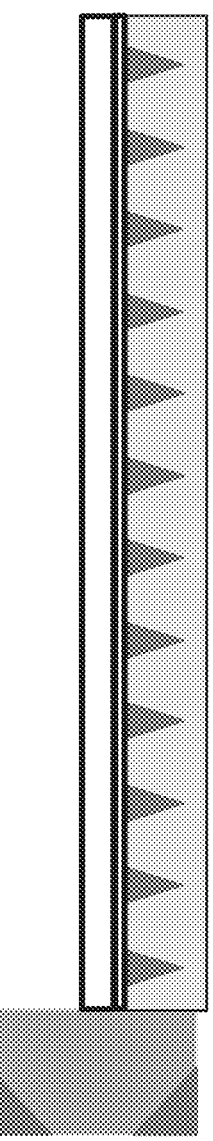

The ETC superstrate laminate sheet can also be added on the inside of the building and laminated on the surface of the window facing the interior of the building. In such configurations, the tip of the triangle can be configured to face outside the building (as shown in FIG. 20) to preserve functionality. At the bottom on the ETC Superstrate sheet, a polymer layer or a layer TCO (transparent conductive oxide) layer can be added to protect the ETCs from moisture and degradation. In many embodiments, the added layer can be made thin (30-100 nm). Although FIGS. 19 and 20 show the ETC superstrates implemented on a double-paned window, such configurations can also be implemented on single-paned windows. FIG. 21 shows an ETC superstrate implemented on the inside (surface facing the interior of the building) of a single-paned window while FIG. 22 shows an ETC superstrate implemented on the outside (surface facing the outside environment) of a single-paned window.

Figure 23:
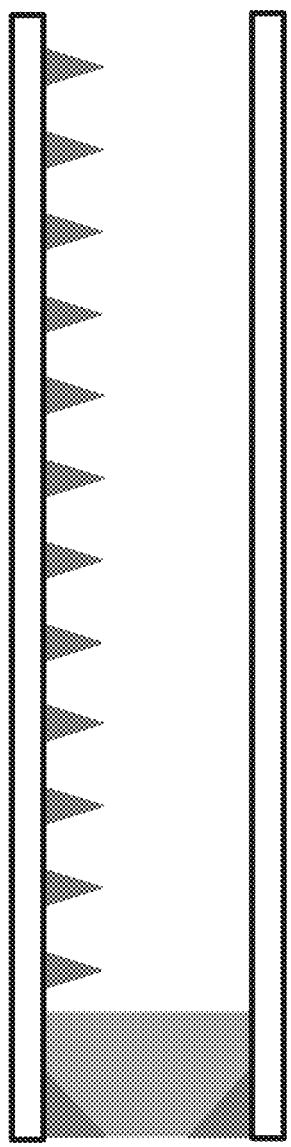
Figure 24:
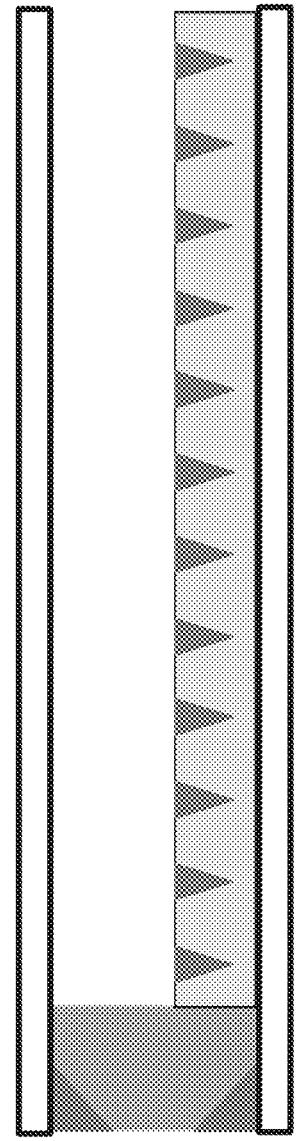
Figure 25:
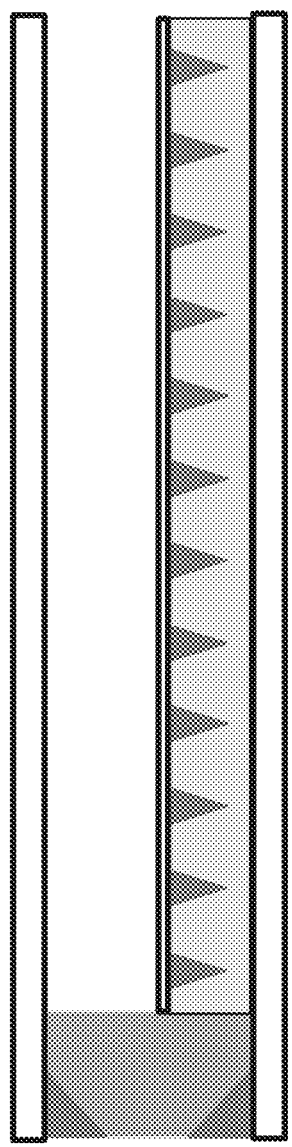

Alternatively, for double-paned windows, the ETCs can be integrated on the inside of the window between the two panes. In some embodiments, the ETCs are free standing—i.e., the ETCs are not encapsulated. In further embodiments, the free-standing ETCs are incorporated on the inside surface of the building-side window pane (as shown in FIG. 23). In such embodiments, the ETCs can be in contact with glass and an inert gas, such as but not limited to argon gas, thereby preserving the ETCs. In other embodiments, the ETCs are embedded inside a polymer superstrate and integrated on the inside of the window. FIG. 24 shows an ETC superstrate that is directly laminated on the glass and located between the two glass panels. In such embodiments, the ETC superstrate can be in contact with the glass and an inert gas. In some configurations, the bottom of the superstrate (the bottom of the triangular ETCs) is in direct contact with the inert gas. In other configurations, the bottom of the superstrate is covered by an additional polymer layer or layer of transparent conductive oxide (as shown in FIG. 25).

Figure 26:
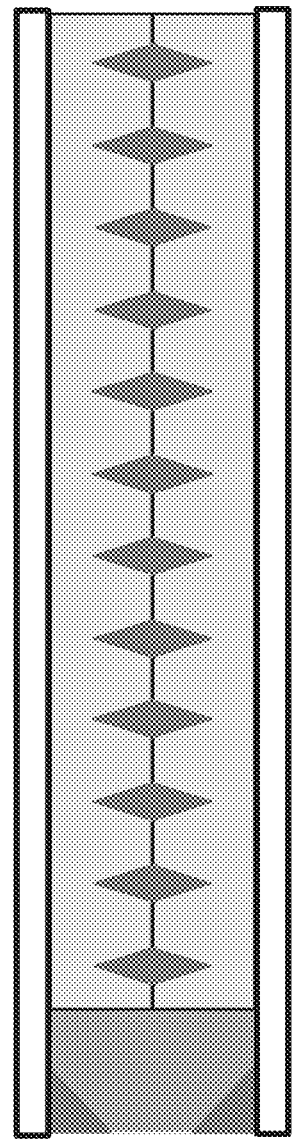

Another set of configurations includes two touching ETCs within a double-paned window. In such configurations, the ETCs can be configured to match up exactly (bottom of the triangular cross sections are in contact). A double-sided ETC configuration can be implemented for various purposes, including but not limited to improving optical properties during the night when the room is illuminated and outside environment is dark. FIG. 26 conceptually illustrates a double-sided ETC configuration in accordance with an embodiment of the invention. Although FIG. 26 illustrates a double-sided ETC configuration in a double-paned window, such configurations can also be implemented in a single-paned window where each side of the window implements an ETC superstrate. Furthermore, in some double-sided ETC configurations, a thin layer of argon gas or any other material can be introduced in between the two ETC superstrates for either optical or insulating purposes.

Figure 28:
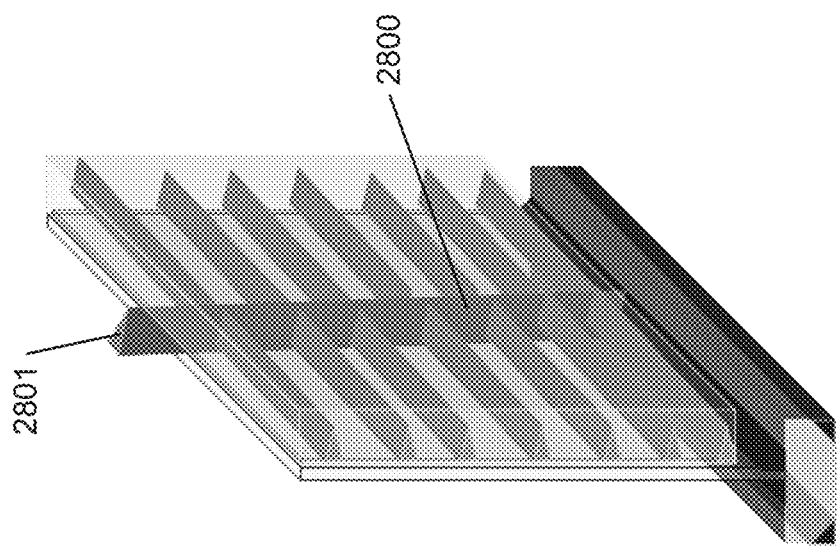
Figure 27:
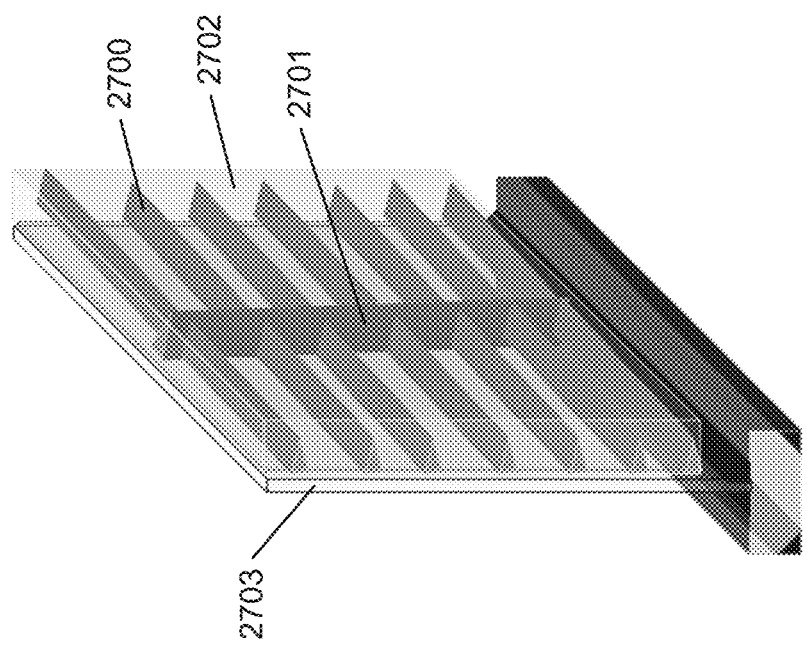

Although the discussion above refers to building applications, it is readily appreciated that the configurations discussed apply to any of the applications discussed in this disclosure, including but not limited to home windows and vehicular windows. Furthermore, the integration of ETCs with windows is not limited to the orientations and patterns shown the FIGS. 19-26. Such orientations and patterns can be adapted to the application as needed. For the integration methods, one or more (triangular) busbar(s) can be added to connect the different ETC gridlines. The busbar can be located in the middle of the window/glass. FIG. 27 conceptually illustrate an ETC window implementing a busbar in accordance with an embodiment of the invention. As shown, the ETC superstrate includes ETC fingers 2700 and an ETC busbar 2701 embedded within a polymer encapsulant 2702. In the illustrative embodiment, the ETC superstrate is affixed to a single-paned window 2703. In some embodiments, the busbar is located around the edges. The busbar(s) can be the connection point to the external power/voltage/current source(s). FIG. 28 conceptually illustrate an ETC window implementing an ETC busbar 2800 as a connection point 2801 to an external power/voltage/current source in accordance with an embodiment of the invention.

Although FIGS. 19-28 illustrate specific configurations of ETC windows, many other configurations exist and can be implemented as appropriate depending on the specific requirements of the given application. For example, in many embodiments, the ETCs are incorporated directly into the glass layer of the window, allowing for even thinner implementations. Furthermore, depending on the application, the fabrication process and materials used can be chosen for compatibility. Materials can be designed such that delamination, bubble formation, and cracks are prevented. Such design choices can include but are not limited to matching heat expansion coefficients.

DOCTRINE OF EQUIVALENTS

While the above description contains many specific embodiments of the invention, these should not be construed as limitations on the scope of the invention, but rather as an example of one embodiment thereof. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:
1. A window comprising:
   a first transparent layer of glass having a first surface and a second surface;
   a first plurality of triangular conductors in optical communication with the first transparent layer of glass;
   wherein each of the first plurality of triangular conductors comprises a base side that is parallel to the first surface of the first transparent layer of glass;

wherein the first plurality of triangular conductors is configured to redirect a portion of incident light, wherein the portion of incident light travels through both the first surface and the second surface of the first transparent layer of glass;

wherein the first plurality of triangular contacts is embedded in a first surface of a superstrate layer, wherein the superstrate layer comprises a second surface opposite the first surface of the superstrate layer; and wherein a plurality of nanostructures disposes on the second surface of the superstrate layer.

2. The window of claim 1, wherein the first surface of the superstrate layer is disposed adjacent to one of the surfaces of the first transparent layer of glass.

3. The window of claim 1, further comprising a layer of transparent conductive oxide disposed adjacent to the first surface of the superstrate layer.

4. The window of claim 1, wherein the superstrate layer comprises a material selected from the group consisting of: ethylene-vinyl acetate, polyurethane, poly-methyl methacrylate, polydimethylsiloxane, ethylene chlorotrifluoroethylene, and ethylene tetrafluoroethylene.

5. The window of claim 1, further comprising an active absorber layer, wherein the first plurality of triangular contacts is configured to redirect the portion of incident light to towards the active absorber layer.

6. The window of claim 1, further comprising a second transparent layer of glass having a first surface and a second surface, wherein the portion of incident light travels through both the first surface and the second surface of the second transparent layer of glass.

7. The window of claim 6, wherein the first and second transparent layers of glass form a sealed cell, wherein the sealed cell comprises argon gas.

8. The window of claim 1, further comprising a plurality of nanostructures disposed on one of the surfaces of the first transparent layer of glass.

9. The window of claim 1, wherein the first plurality of triangular contacts comprises a metallic nanoparticle ink selected from the group consisting of: silver nanoparticle ink and copper nanoparticle ink.

10. The window of claim 1, wherein one of the first plurality of triangular contacts comprises an aspect ratio that is different than an aspect ratio of another of the first plurality of triangular contacts.

11. The window of claim 1, wherein the first plurality of triangular contacts are patterned in a parallel configuration, wherein a pitch between two of the first plurality of triangular contacts is different than a pitch between another two of the first plurality of triangular contacts.

12. The window of claim 1, further comprising a set of electrodes electrically coupled to the first plurality of triangular contacts.

* * * * *